(12) United States Patent
Smithwick et al.

(10) Patent No.: US 12,298,537 B2
(45) Date of Patent: May 13, 2025

(54) MIRROR DISPLAY WITH INCREASED BRIGHTNESS

(71) Applicant: DISNEY ENTERPRISES, INC., Burbank, CA (US)

(72) Inventors: Quinn Y. Smithwick, Pasadena, CA (US); Franklin T. Batino, Northridge, CA (US); Michael Ilardi, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 496 days.

(21) Appl. No.: 17/688,169

(22) Filed: Mar. 7, 2022

(65) Prior Publication Data
US 2023/0280598 A1 Sep. 7, 2023

(51) Int. Cl.
*G02B 30/52* (2020.01)
*G02B 27/14* (2006.01)
*G02B 30/56* (2020.01)
*H04N 13/337* (2018.01)

(52) U.S. Cl.
CPC ........... *G02B 30/52* (2020.01); *G02B 27/145* (2013.01); *G02B 30/56* (2020.01); *H04N 13/337* (2018.05); *G02B 27/144* (2013.01)

(58) Field of Classification Search
CPC ...... G02B 30/52; G02B 27/145; G02B 30/56; G02B 27/144; G02B 30/25; H04N 13/337; H04N 13/363

USPC .......................................................... 359/609
See application file for complete search history.

(56) References Cited

U.S. PATENT DOCUMENTS

| | | | |
|---|---|---|---|
| 9,615,054 B1* | 4/2017 | McNelley | H04N 7/144 |
| 11,099,403 B2 | 8/2021 | Smithwick et al. | |
| 2018/0284464 A1* | 10/2018 | Lu | G02F 1/29 |
| 2020/0012115 A1* | 1/2020 | Yamada | G02B 30/56 |

* cited by examiner

*Primary Examiner* — Audrey Y Chang
(74) *Attorney, Agent, or Firm* — Dorsey & Whitney LLP

(57) ABSTRACT

A display system for a providing a three-dimensional effect with controlled reflections is disclosed. In one embodiment, the display system includes a display; and a beam splitter positioned between the display and the viewing location. The beam splitter transmits or reflects light based on a characteristic of the light. A physical prop is positioned between the beam splitter and the viewing location. The display is oriented to emit light toward the beam splitter and displays an image at least partially viewable in the viewing location through the beam splitter, such that the image is substantially un-attenuated by the bean splitter. Light reflected from the physical prop and further reflected by the beam splitter toward the viewing location is at least partially viewable in the viewing location. The display system is suitable to enable a substantially full brightness of the image to be viewable in the viewing location.

16 Claims, 16 Drawing Sheets

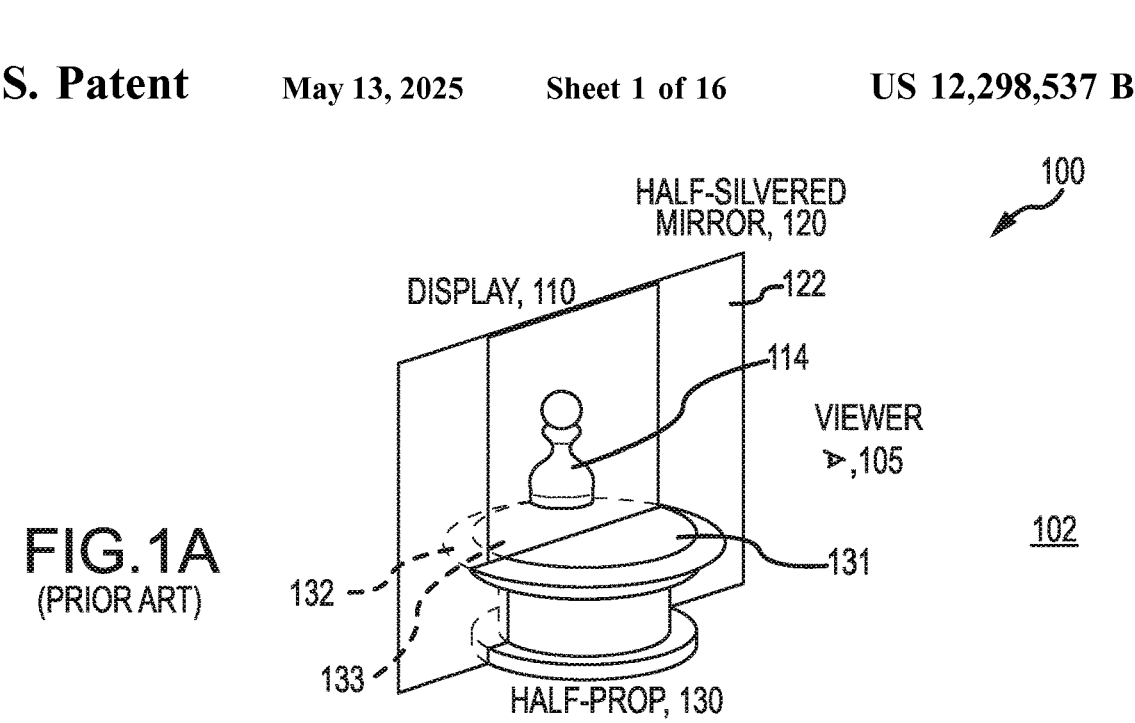
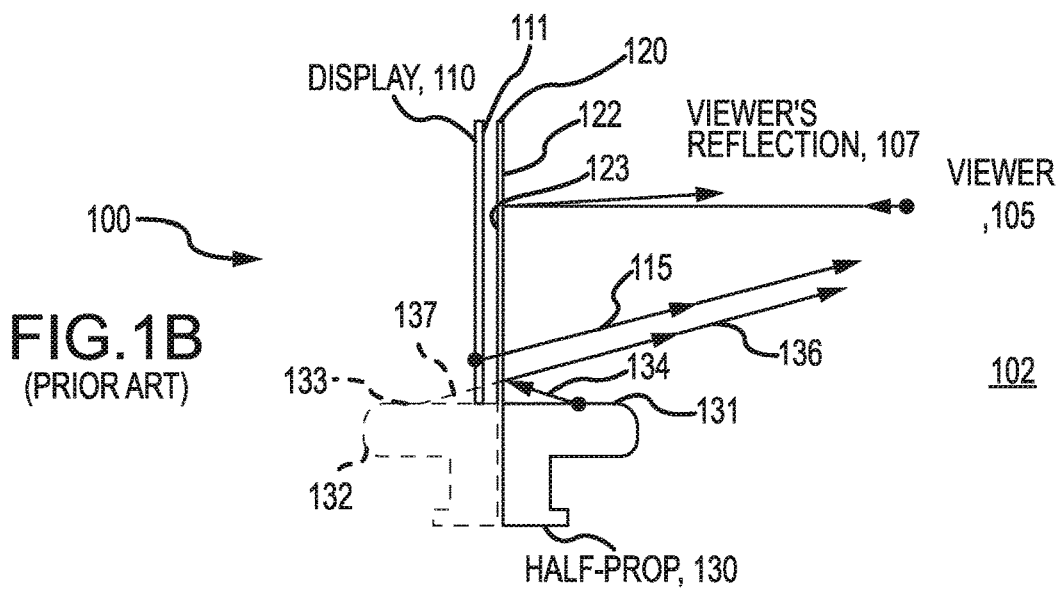
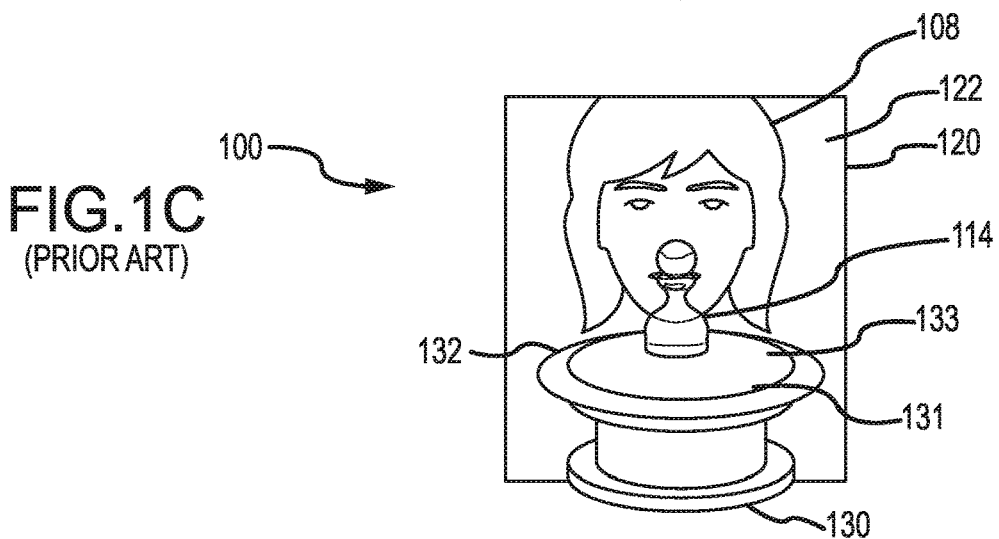

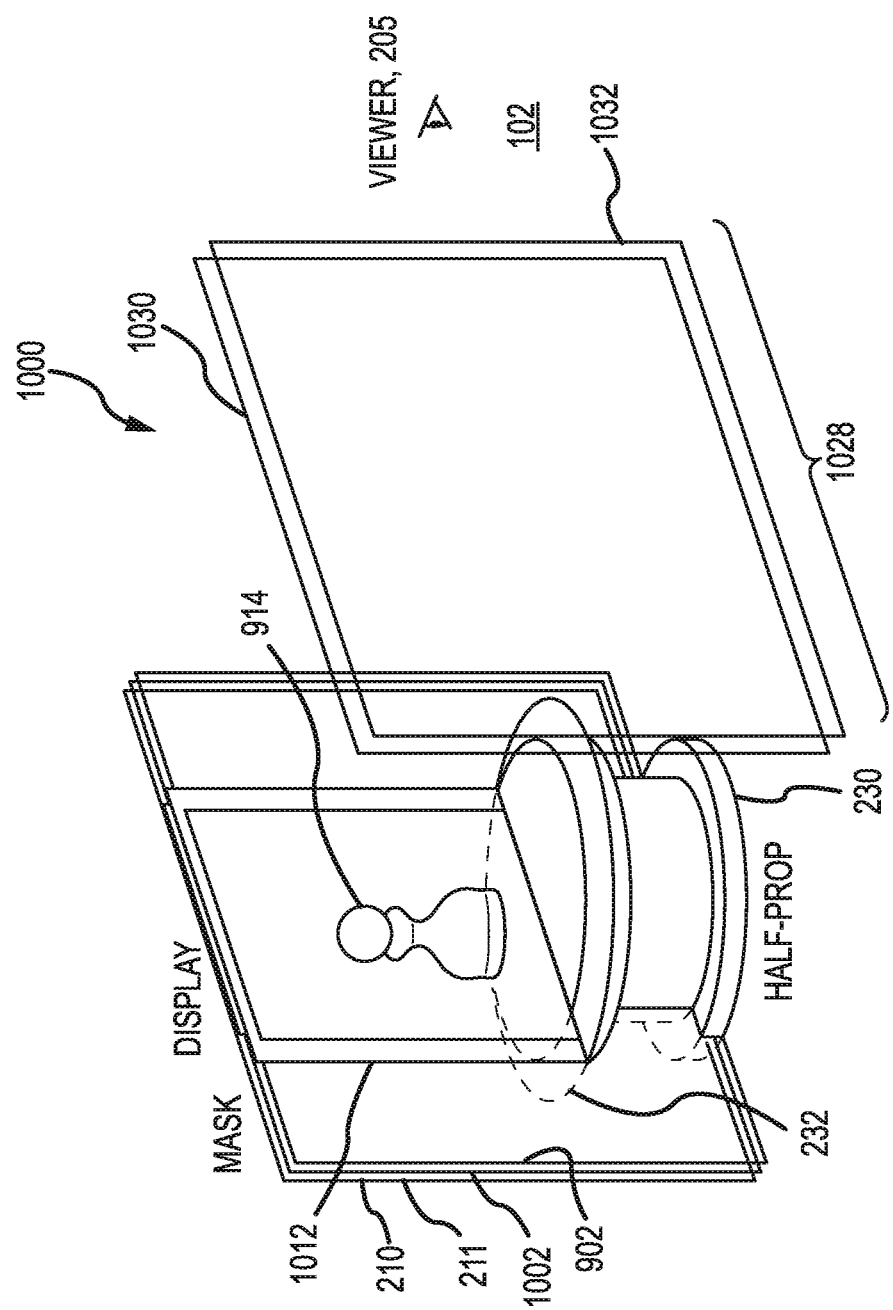

MIRROR DISPLAY WITH INCREASED BRIGHTNESS

CROSS REFERENCE TO RELATED APPLICATIONS

The present application is related to U.S. patent application No. 16/190,262 filed Nov. 14, 2018 and entitled "Mirror Display Without Viewer Reflection," the entirety of which is incorporated herein by reference for all purposes.

FIELD OF THE DESCRIPTION

The present description relates, in general, to compact display systems to provide a three-dimensional (3D) mirror illusion, and, more particularly, to systems and methods for producing 3D images or depth and space media illusions without requiring viewers to wear 3D glasses or other eyewear by using mirror techniques combined with other optical components and arrangements to eliminate viewer reflection that had hindered prior mirror-based displays.

RELEVANT BACKGROUND

There is a growing demand for displays that include 3D imagery to capture attention and entertain visitors of a facility. One conventional approach to providing 3D imagery without the need for 3D or other special eyewear has been the use of Pepper's Ghost displays. Pepper's Ghost is an illusionary technique used by magicians, by ride or attraction designers, and by others to produce a 3D illusion of a latent or ghost-like image. Using a simple piece of plate glass or transparent plastic (e.g., a Mylar sheet) that acts as a beam splitter and special lighting techniques, Pepper's Ghost systems can make objects appear, move, and/or disappear within a scene or room.

Conventionally, these systems include a main room or scene that is readily viewed by an audience or viewers and a hidden room that is not visible to the audience/viewers. Both rooms may be identical in their physical structure including furniture and other objects except the hidden room may include additional objects or characters such as a ghost. A large piece of glass/plastic or a half-silvered mirror is situated between the viewer and the scene at an angle, such as at about 45 degrees. When the main room is illuminated and the hidden room is darkened, the viewer only views the main room as the hidden room does not reflect from the glass and the sheet of glass is itself hard to view as it typically extends across the entire view of the main room.

Pepper's ghost then becomes visible to the viewer when the entire hidden room or portions such as the ghost or other character are lit. Since only a portion of the light cast upon the ghost or other objects in the hidden room is reflected from the glass/plastic sheet, the reflected images appear as latent or ghostly images relative to the objects in the main room (e.g., the reflected images or images superimposed in the visible room may appear to float). The Pepper's Ghost image is a 3D image that may be a still image or animation may be provided such as with animatronics providing the "ghost" or by placing a live actor in the hidden room. In a broad sense, the Pepper's Ghost systems may be thought of as implementing autostereoscopy, which is generally a method of displaying 3D images that can be viewed without the use of headgear or glasses on the part of the user. One of the main limitations of conventional Pepper's Ghost displays is that their typical size is quite large, i.e., a whole room plus a similarly sized adjacent room.

However, there are many settings, such as a queue into a theater, ride or other park attraction, a display window of a retail or other facility, and other locations where groups of people pass, where it is highly desirable to provide much more compact eye-catching visual displays and 3D entertainment. Therefore, there remains a need for other display configurations that would be useful when relatively small spaces are available (e.g., a space that is one to several feet on each side).

To produce a compact 3D illusion with synthetic characters or effects appearing on or around physical objects, it has been common to use a variation of the Pepper's Ghost illusion. FIG. 1A illustrates an exemplary layout of such a Pepper's Ghost display system 100 operating to provide a compact 3D illusion. The system 100 is positioned in or near a viewing location 102 in which a viewer 105 is located. The system 100 includes a display 110 such as a liquid crystal display (LCD) monitor that operates to display an image 114 (here, a pawn of a chess set). A beam splitter 120 in the form of a planar half-silvered mirror is positioned in the system 100 to be parallel to and spaced apart a small distance from the display 110 with a first or outer surface 122 facing the space 102 and viewer 105.

A physical half prop 130 (here, half a pedestal) is placed in abutting contact with the outer surface 122 of the beam splitter or mirror 120 so that its upper or top surface 131 is orthogonal to a lower edge of the display 110, while the beam splitter 120 may be sized to be larger than the display 110 and extend to the bottom of the half prop 130 as shown in FIG. 1A. The vertical, partially-silvered mirror 120 completes the image of the half prop 130 as can be viewable at 132 and with extended top surface 133 of physical surface 131, and the mirror 120 also allows a direct view of the image 114 on the display 110 (or its monitor 111) hidden directly behind (and, often, in contact with) the half-silvered mirror or beam splitter 120.

FIG. 1B illustrates a side view of the system 100 showing that the monitor 111 of the display 110 is parallel to and faces a second or inner (or back) surface 123 of the beam splitter 120. Light 115 output from the monitor 111 passes, with some blockage, to the viewer 105 to provide a direct view of the image 114. Light 134 bouncing off surfaces 131 of the half prop 130 strike the first or outer surface 122 of the beam splitter 120 and are reflected as reflected light 136 to the viewer 105 which, as shown with dashed line 137, completes the half prop as shown for top surface 131 at 133 (e.g., the reflected light 136 appears to be coming from a point behind the beam splitter 120). Unfortunately, ray tracing 107 also shows that light bouncing off the viewer 105 is also reflected from the first or outer surface 122 toward the viewer 105.

FIG. 1C provides a typical 3D illusion achieved (e.g., from a viewer's perspective) with the use of the conventional Steinmeier illusion display system 100. It shows a completed half prop 130 at 132 including the full top surface 131 with reflected surface images 133, and the displayed image 114 appears to be on the completed top surface 133. However, the viewer 105 also often will view their own reflection 108 via the half-silvered mirror 120. The illusion can be ruined by the undesired reflections of the environment or the visitor (as shown with reflection 108) from the mirror's surface 122. Other problems with use of the system 100 include that the virtual object or effect 114 only appears at the plane of symmetry, which limits the positioning of the object 114 and possibly gives away the way the effect is achieved to the viewer 105. There also is no backdrop behind the physical prop 130 and virtual object 114.

Hence, there remains a need for an improved compact 3D display system that can be used to provide 3D illusions and effects without requiring a viewer to wear special eyewear. Preferably, the improvements would include avoiding reflecting back images of the viewers.

SUMMARY

Reflections of viewers can be eliminated in a new compact mirror-based 3D display system by positioning a polarizer between the viewer in a viewing location and the beam splitter, which may take the form of a silvered mirror (e.g., partially or half-silvered mirror), while maintaining the illusion of a displayed image on, in, or around a completed reflected prop. The polarizer may be a circular polarizer and acts to cancel the undesired reflections.

The new mirror-based 3D display system may provide further enhancements by including rear-facing imagery provided behind the polarizer, which are reflected from the front or first surface of the partially silvered mirror into the viewing location and extend the scene that appears to be located behind the mirror. The mirror-based 3D display system may also utilize additional components for creating effects that move in depth and that are in 3D. This may include rotation of the display (or its monitor or display screen) from parallel to an offset angle that often will be in the range of 15 to 60 degrees (e.g., 25 to 45 degrees or the like) to allow displayed images to move toward and away from the mirror and not be locked into a plane parallel to and often abutting the mirror.

More particularly, a display system is provided for creating a 3D effect while controlling reflections of a viewer or other exterior objects. The system includes a viewing location, and a planar beam splitter with a first surface facing the viewing location and a second surface facing away from the viewing location. The system further includes a polarizer disposed between the first surface of the beam splitter and the viewing location blocking light originating in the viewing location and reflected by the beam splitter. Additionally, the system includes a physical prop positioned between the beam splitter and the polarizer. The 3D effect is achieved with the system by providing a display with a display screen facing the second surface of the beam splitter. The display is operated to provide a displayed image on the display screen viewable in the viewing location concurrently with light from the physical prop reflected by the beam splitter through the polarizer.

In some embodiments, the polarizer is a circular polarizer with a planar or curved body. In such cases, the polarizer may further include an anti-reflection coating on a surface of the body facing the viewing location. In the same or other embodiments, the system may include an opaque framing panel disposed between the polarizer and the physical prop. The framing panel includes an aperture passing light to and from the viewing location, and the framing panel further includes a back surface facing the first surface of the beam splitter and including backdrop imagery or objects. In some preferred embodiments, the display is a 3D display. In these or other useful implementations, the display system includes a lens disposed between the display screen and the beam splitter focusing the displayed image to a location between the beam splitter and the polarizer.

In one specific embodiment where it is desirable to provide a backdrop without a framing panel, the polarizer includes a ¼ wave film proximate to the physical prop and a horizontal polarizer proximate to the viewing location. In such systems, a polarization preserving screen may be disposed between the ¼ wave film and the horizontal polarizer, and a projector is included that projects a backdrop image onto a surface of the polarization preserving screen facing the viewing location. Also, in such systems, a circular polarizer may be disposed between the display and the beam splitter. The ¼ wave film and the horizontal polarizer can both be planar, spaced apart, and arranged to be parallel. Further, it may be useful that the projector be a short throw video projector, and the projector and display be concurrently operated to provide the displayed image and to project the backdrop image.

In one embodiment, a display system for a providing a three-dimensional effect with controlled reflections is disclosed. The display system includes a display; a beam splitter positioned between the display and a viewing location that transmits or reflects light based on a characteristic of the light; and a physical prop positioned between the beam splitter and the viewing location. The display is oriented to emit light toward the beam splitter and displays an image at least partially viewable in the viewing location through the beam splitter, such that the image is substantially un-attenuated by the bean splitter. Light reflected from the physical prop and further reflected by the beam splitter toward the viewing location is at least partially viewable in the viewing location.

Optionally, in some embodiments, the beam splitter includes a polarization selective mirror; the characteristic of the light comprises a polarization; and the polarization selective mirror passes a first polarization of the light and reflects second polarization of the light.

Optionally, in some embodiments, the first polarization of light is orthogonal to the second orientation of light.

Optionally, in some embodiments, the first polarization is right circularly polarized and the second polarization is left circularly polarized.

Optionally, in some embodiments, the display emits linearly polarized light that passes through the polarization selective mirror toward the viewing location.

Optionally, in some embodiments, light reflected by the physical prop and light reflected by a viewer in the viewing location are randomly polarized.

Optionally, in some embodiments, the polarization selective mirror polarizes the randomly polarized light reflected by the physical prop and the randomly polarized light reflected by the viewer and incident on the polarization selective mirror to attenuate the reflections thereof.

Optionally, in some embodiments, the beam splitter includes a wavelength selective mirror; the characteristic of the light comprises a wavelength of the light; and the wavelength selective mirror passes one or more spectrally encoded peaks of light, each peak including a respective wavelength or range of wavelengths and reflects light with a wavelength different than the respective wavelength or range of wavelengths of the one or more spectrally encoded peaks of light.

Optionally, in some embodiments, the display emits light in the one or more spectrally encoded peaks that passes through the wavelength selective mirror toward the viewing location.

Optionally, in some embodiments, the display system includes a light source that emits the light with the wavelength different than the respective wavelength or range of wavelengths of the one or more spectrally encoded peaks of light into the viewing location.

Optionally, in some embodiments, light reflected by the physical prop and light reflected by a viewer in the viewing location includes the light with the wavelength different than the respective wavelength or range of wavelengths of the one or more spectrally encoded peaks.

Optionally, in some embodiments, the light reflected by the physical prop and light reflected by the viewer in the viewing location are incident on the wavelength selective mirror and the wavelength selective mirror reflects the incident light back into the viewing location as reflected light, with the one or more spectrally encoded peaks removed from the reflected light.

Optionally, in some embodiments, the display system includes a half wave element plus quarter wave element combination positioned between the display and the wavelength selective mirror; a circular polarizer positioned between the wavelength selective mirror and the viewing location.

Optionally, in some embodiments, light reflected by a viewer in the viewing location is randomly polarized; the light reflected by the viewer passes through the circular polarizer and becomes circularly polarized with a first handedness; the light reflected by the viewer reflects from the wavelength selective mirror and becomes circularly polarized with a second handedness opposite the first handedness; and the light reflected by the viewer passes through the circular polarizer where the light is canceled, thereby making the light reflected by the viewer not visible by the viewer.

Optionally, in some embodiments, the display system includes a physical backdrop positioned between the circular polarizer and the wavelength selective mirror. The physical backdrop is illuminated with randomly polarized light that reflects off of the physical backdrop toward the wavelength selective mirror; the light reflected off of the physical backdrop reflects off the wavelength selective mirror toward the circular polarizer and travels through the circular polarizer becoming linearly polarized such that the physical backdrop is visible by the viewer as a virtual backdrop distance behind the display.

Optionally, in some embodiments, the display system includes a first projector configured to display a first complementary light image polarized in a first direction on the physical prop; and a second projector configured to display a second complementary light image polarized in a second direction orthogonal to the first direction on the physical prop, wherein the first complementary light image and the second complementary light image are projected to form a combined image.

Optionally, in some embodiments, the display system includes: a first projector configured to display a first complementary image with light including one or more spectrally encoded peaks; and a second projector configured to display a second complementary image with broad spectrum light in which one or more spectral notches have been removed. The respective spectrums of light of the one or more spectrally encoded peaks correspond to respective spectrums of light of the one or more spectral notches. The first complementary light image and the second complementary light image are projected to form a combined image.

Optionally, in some embodiments, the combined image is such that the physical prop and a virtual image of the physical prop are not symmetric.

Optionally, in some embodiments, the image comprises an image of an actor on a canted stage.

A method of providing a three-dimensional (3D) effect with controlled reflections is disclosed. The method includes providing a display; providing a beam splitter positioned between the display and the viewing location that transmits or reflects light based on a characteristic of the light; providing a physical prop positioned between the beam splitter and the viewing location. The display is oriented to emit light toward beam splitter and displays an image at least partially viewable in the viewing location through the beam splitter, such that the image is substantially un-attenuated by the bean splitter, and light reflected from the physical prop and further reflected by the beam splitter toward the viewing location is at least partially viewable in the viewing location.

BRIEF DESCRIPTION OF THE DRAWINGS

FIGS. 1A-1C are, respectively, a perspective view of a Steinmeier illusion display system during operation, a side view of the display system of FIG. 1A showing a ray tracing, and a front view or viewer perspective of the display system of FIGS. 1A and 1B;

FIG. 10B illustrates a perspective view of the display system of FIG. 10A.

DETAILED DESCRIPTION

Briefly, embodiments described herein are directed toward mirror-based three-dimensional (3D) display systems. The new mirror-based 3D display systems combine the use of a beam splitter (i.e., an optical device that splits a beam of light into two beams with one transmitted through and one reflected such as a partially or half-silvered mirror or more generally a pellicle mirror), which both transmits and reflects light along with a physical prop, a display positioned behind the beam splitter, and a polarizer positioned between the beam splitter's first or outer surface and a viewing location in which viewers are located. The polarizer, which may be a circular polarizer in some cases, acts to cancel out undesired reflections including reflections of light from the viewing location that would have otherwise included the viewer's own image.

Figure 2A:
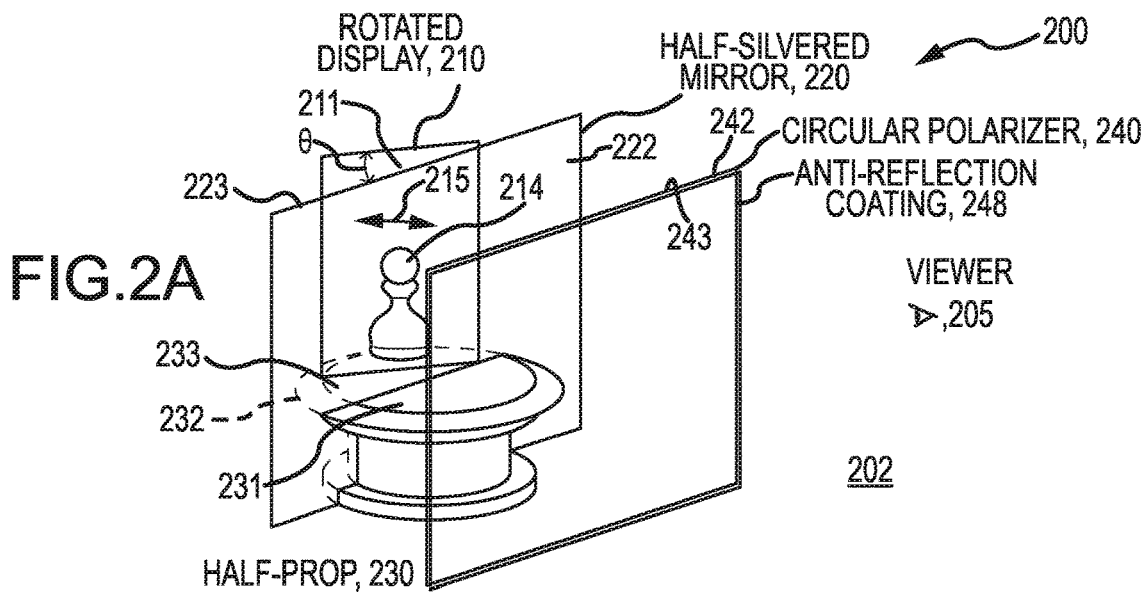
FIGS. 2A-2C are, respectively, a perspective view of a new mirror-based 3D display system of the present description during operation, a side view of the display system of FIG. 2A showing a ray tracing, and a front view or viewer perspective of the display system of FIGS. 2A and 2B.
Figure 2B:
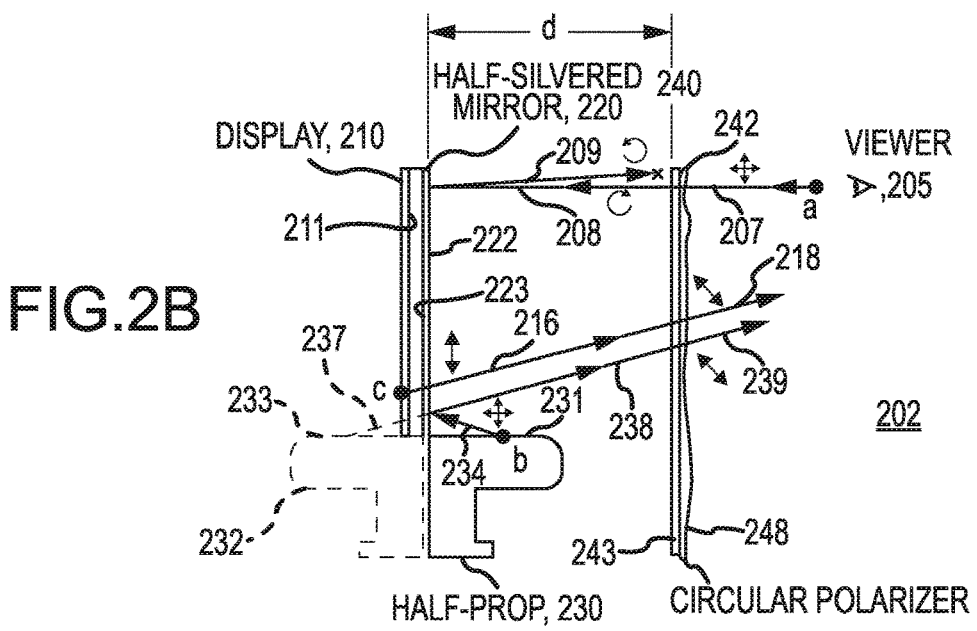
Figure 2C:
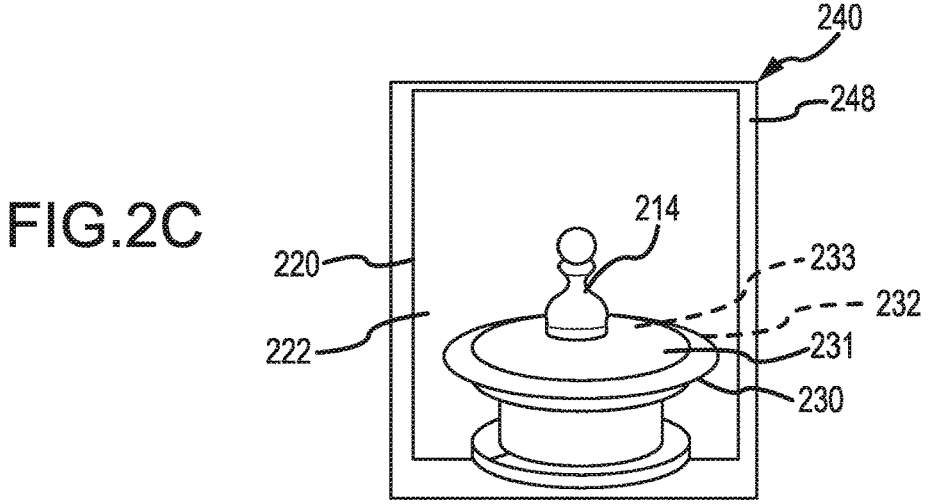

To produce a compact 3D illusion with synthetic characters or effects appearing on or around physical objects while eliminating viewer's reflections, the inventors designed the mirror-based 3D display system 200 shown in FIGS. 2A-2C. FIG. 2A illustrates an exemplary layout for a new mirror-based 3D display system 200 operating to provide a compact 3D illusion. The system 200 is positioned in or near a viewing location 202 in which a viewer 205 is located. The system 200 includes a display 210 such as a liquid crystal display (LCD) with monitor/display screen 211 that is operating to display an image 214 (here, a pawn of a chess set), which may be a still image or an animated image (i.e., a video stream on monitor 211).

A beam splitter 220, which may be in the form of a planar half-silvered mirror, is positioned in the system 200 between the viewing location 202 and the display monitor/display screen 211, with a first or outer surface 222 facing the space 202 and viewer 205 and with a second or inner (or back) surface 223 facing toward the display 210. The display screen 211 may be parallel to the back surface 223 (as shown in FIGS. 1A and 1B with screen 111), or, more preferably as shown, the display screen 211 is rotated relative to the plane of the back surface 223 (such as with a forward edge abutting or near the back surface 223) to be vertical (or with a longitudinal axis parallel to that of mirror 120) but at an offset angle, θ, in the range of 15 to 60 degrees (e.g., 25 to 45 degrees or the like). This allows displayed images 214 to be selectively moved toward and away from the mirror 210 as shown with arrows 215, such as by choosing the animated images/video stream fed to the display 210 by a system controller not shown but understood to be a video server or the like to cause the image 214 to move to the left and right on the screen 211, and not be locked into a plane parallel to and often abutting the mirror (as in system 100).

A physical half prop 230 (here, half a pedestal) is placed in abutting contact with the outer surface 222 of the beam splitter or mirror 220 so that its upper or top surface 231 is orthogonal and coplanar to a lower edge of the display 210. The beam splitter 220 may be sized to be larger than the display 210 and may extend to the bottom of the half prop 230 as shown in FIG. 2A. The vertical, partially-silvered mirror 220 completes the image of the half prop 230 as can be viewable at 232 and with extended top surface 233 of physical surface 231 by reflecting light (e.g., half of the light it receives on surface 222). The beam splitter 220 transmits light (e.g., half of the light that strikes its surface 223) so that it allows a direct view of the image 214 on the display 210 (or its monitor/display screen 211) hidden directly behind the half-silvered mirror or beam splitter 220.

Further, and significantly, the display system 200 further includes a polarizer 240 disposed between the viewing location 202 (and viewer 205) and the first or outer surface 222 of the beam splitter 220. The polarizer 240 may be planar as shown or have an arcuate or semi-circular cross section in some cases. The polarizer 240 may be a circular polarizer with a first or front (outer) surface 242 facing toward the viewing location 202 (and viewer 205) and a second or back (inner) surface 243 facing toward the beam splitter 220, and the polarizer 240 may be vertical (when the beam splitter 220 is vertical, for example) and may be parallel to and spaced apart a distance, d (as viewable in FIG. 2B, e.g., 0 to 12 inches or more to suit the size of the physical prop 230) from the first/outer surface 222 of the beam splitter 220. An anti-reflection coating (or layer of anti-reflective material) 248 may be applied to the first or outer surface 242 of the polarizer to further reduce reflection of light from the viewing location 202. As discussed below, the polarizer 240 is included in the display system 200 to cancel the undesired reflections into the viewing location 202, especially of the viewer 205.

FIG. 2B illustrates a side view of the system 200 showing that the monitor 211 of the display 210 is rotated but still faces the second or inner (or back) surface 123 of the beam splitter 220. Light 216 output from the monitor/display screen 211 passes (is transmitted), with some blockage (e.g., 50 percent), to the viewer 205 in space 202 to provide a direct view of the image 114 after passing through circular polarizer 240 as shown at 217. Light 234 bouncing off surfaces 231 of the half prop 230 strike the first or outer surface 222 of the beam splitter 220 and are reflected (e.g., 50 percent) as reflected light 238 to the viewer 205 via the circular polarizer 240 which, as shown with dashed line 237, completes the half prop as shown for top surface 231 at 233 (e.g., the reflected light 238 and the polarized light 239 appears to be coming from a point behind the beam splitter 220). Further, ray tracing 207, 208, and 209 shows that light bouncing off the viewer 205 is reflected from the first or outer surface 222 toward the viewer 205 but is blocked from view by the polarizer 240.

As shown, the light reflected off the viewer's face 207 or any other object or surface outside the display system 200 is typically randomly polarized. After passing through the polarizer 240 (e.g., a right circular polarizer), this light 208 is (right) circularly polarized. It reflects as shown at 209 off the half-mirror 210 to become (left) circularly polarized in the orthogonal polarization state. The light 209 travels back towards the (right) circular polarizer 240 and the viewer 205, but this orthogonally (left) circularly polarized light is rejected by the (right) circular polarizer 240. Hence, the viewer 205 does not view his/her own reflections or the environment outside the display system 200 as the reflected light is polarized in a manner to be blocked by the polarizer 240 such that it does not reach the viewing location 202 (see, FIG. 2B at "a").

In contrast, the light 234 from the prop 230 is randomly polarized, and some light 238 reflects off the beam splitter 220 at front or first surface 222 remaining randomly polarized. This light 238 then passes through the circular polarizer 240 after striking second or back/inner surface 243 into the space 202 for viewing by viewer 205 as a virtual image 232 and 233 behind the mirror 220 (as shown with dashed line 237). This virtual image 232, 233 is a "mirror" image of the symmetric half prop 230 that visually completes the prop 230. Similarly, linearly polarized light 216 from the display 210 (e.g., an LCD panel or other useful display device) passes through the beam splitter 220 and remains linearly polarized. Then, some light 217 of its light 216 passes through the circular polarizer 242 after striking back/second surface 243 into space 202 to be viewable by the viewer 205 as if originating from the location on the physical prop 230. The space behind the mirror 240 may be kept unlit/dark so the display bezel is not viewable. The display 210 is rotated to an offset angle, θ, so the screen 211 is not parallel to the mirror 220. In this way, the displayed images (characters, objects, or the like) 214 can be designed (e.g., through left to right or vice versa movements on screen 211) to appear to travel in depth and are not located only in the reflection plane, which could undesirably give away the effect.

FIG. 2C provides a 3D illusion achieved (e.g., from a viewer's perspective) with the use of the mirror-based 3D display system 200. It shows a completed half prop 230 at 232 including the full top surface 231 with reflected surface images 233, and the displayed image 214 appears to be on the completed top surface 233. The viewer 205 is prevented from viewing their own reflection due to inclusion of the polarizer 240 (along with anti-reflection coating 248). Further, the system 200 has a display screen 211 rotated to an offset angle, θ, from parallel with the beam splitter 220 such that the virtual object or effect 214 appears (when is animated and not a still image) to move relative to the plane of symmetry.

Generally, with system 200, the reflections of anything positioned in front of the (right) circular polarizer 240 (e.g., in viewing location 202) will not be visible to the viewer 205 in the display's beam splitter (e.g., half-silvered mirror) 220. In contrast, anything illuminated or transmitting light that is positioned behind the (right) circular polarizer 240 (opposite side of space 202 towards the half-prop 230) with orthogonal (left circular) polarization components will be viewable by viewers 205 in the viewing location 202 through the circular polarizer 240. Conversely, anything behind the (right) circular polarizer 240 that emits (or reflects and/or becomes) the same (right circular) polarization state as the (right) circular polarizer 240 will not be viewable through the (right) circular polarizer 240 by the viewers 205. Note, the polarizer 240 may be curved (see FIG. 5 below, for example) or may be faceted as well to provide a particular effect and/or to suit a particular facility or implementation environment.

It may, in some embodiments, be desirable to have backdrop imagery appear to the viewer 205 to be located behind the virtual object and half-prop. Because the display 200 has a physical scree and frame, a background simply positioned behind the display would be occluded and blocked, thus revealing the presence of a display screen and frame. The light from a background behind the display would also add to the light from the reflected half-prop, making the reflected portion of the half-prop appear semi-transparent or ghostly. To add a virtual backdrop to achieve extra depth in the 3D illusion or effect, the inventors created the mirror-based 3D display system 300 of FIGS. 3A-3C, with components matching those from system 200 having like numbering and not described again in detail as being understood from the description of FIGS. 2A-2C.

Figure 3A:
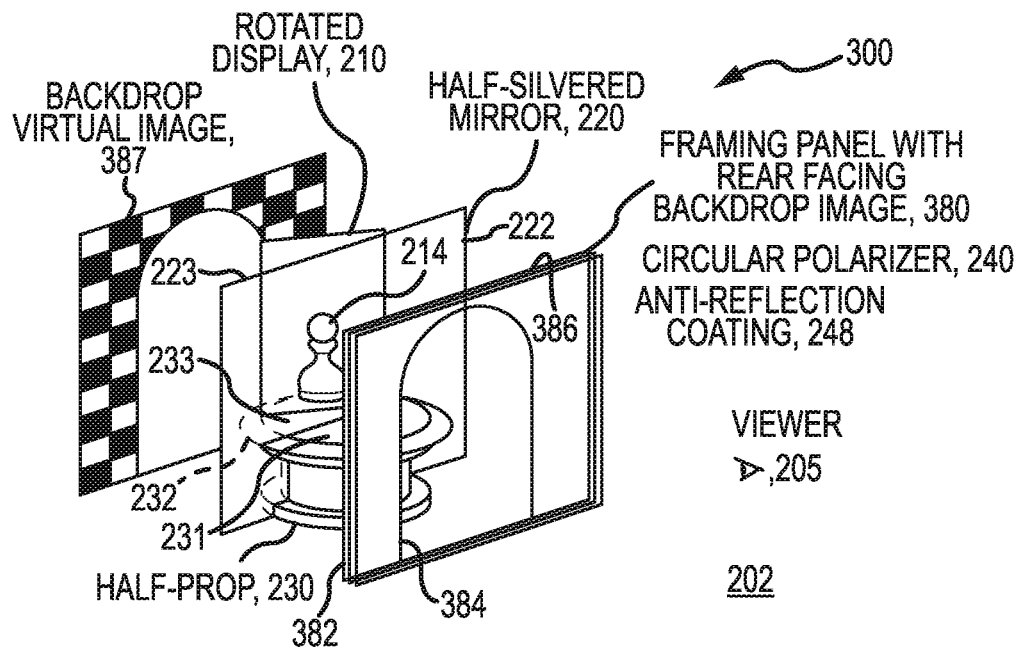
FIGS. 3A-3C are, respectively, a perspective view of an embodiment of a mirror-based 3D display system, similar to that of FIGS. 2A-2C but adapted to provide a backdrop, during operation, a side view of the display system of FIG. 3A showing a ray tracing, and a front view or viewer perspective of the display system of FIGS. 3A and 3B.
Figure 3B:
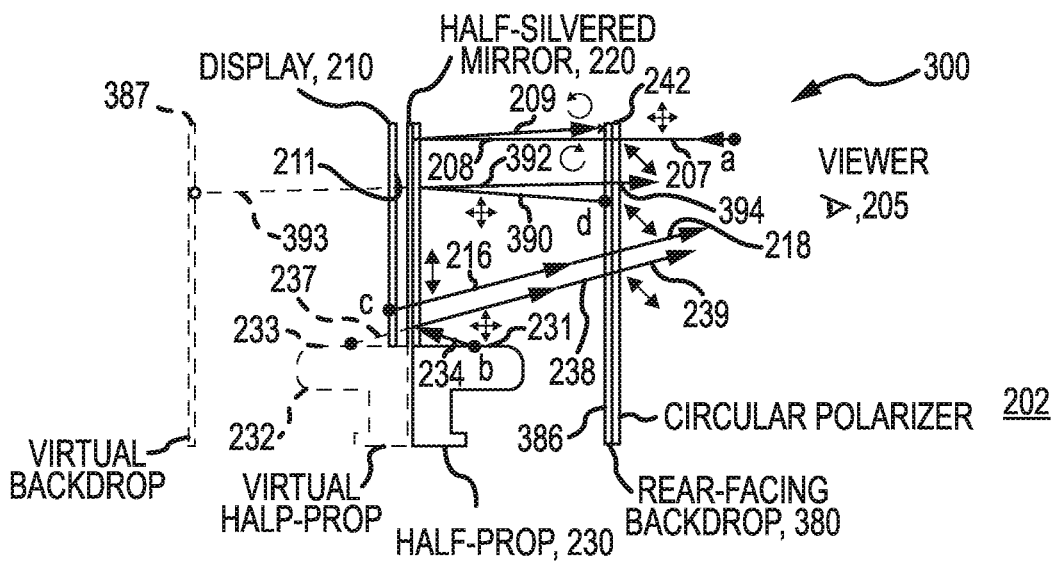
Figure 3C:
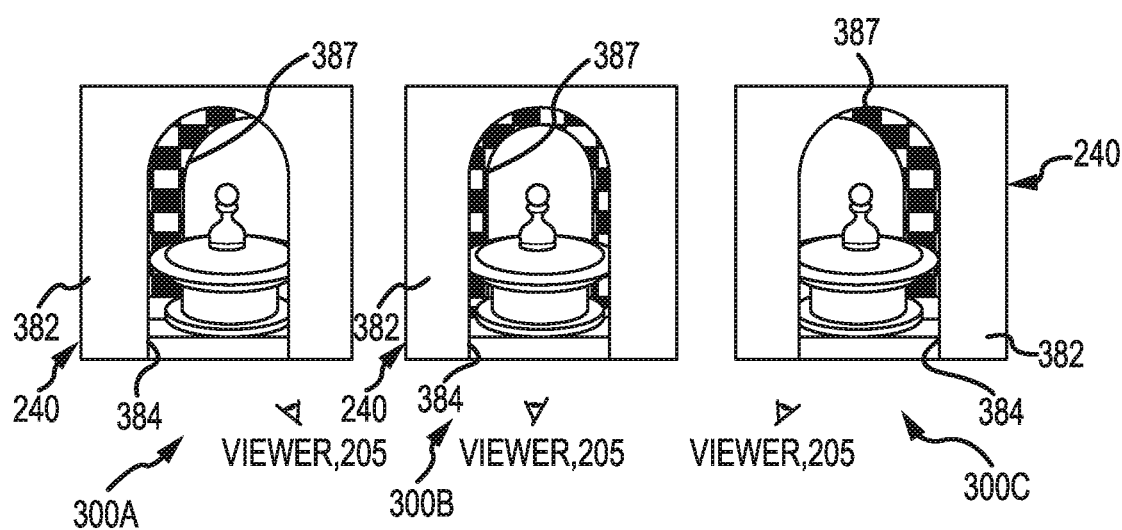

Specifically, as shown in FIGS. 3A-3C, a virtual backdrop 387 is added in system 300 by placing a framing panel 380 is included and placed behind the polarizer 240 (such as abutting or proximate to the second or inner surface 243 of the polarizer 240). The panel 380 is typically formed of an opaque material (such as a plastic sheet, a metal foil, sheet, or layer, or the like) and includes an aperture 384 (e.g., a rectangular shape with a circular arch in this example, but nearly any shape may be used) where a shape is formed by removal or omission of the opaque material of the body/sheet of the panel 380. The aperture 384 may be centrally located as shown. A back side 386 of the panel 380 is configured to display the backdrop virtual image 387 (such as with an applied ink layer, with carvings or attached objects, and/or the like) facing toward the beam splitter 220 (away from the viewing location 202 and viewer 205 so hidden from direct viewing).

Light 390 scattered off the back or second side 386 of the panel 380 (with backdrop imagery, designs, and the like) is randomly polarized and so will the portion 392 that is reflected from the first or outer surface 222 of the half-silvered mirror 220. Some components 394 of the randomly polarized light 392 reflected from mirror 220 and striking the inner or second surface 243 of the circular polarizer 240 are passed through into the space 202 where they can be viewable by the viewer 205 concurrently with the virtual image 214 (and the real prop 230 and the virtual prop 232) as a backdrop virtual image (or virtual backdrop) 387 through the aperture 384. The rear facing imagery on back side/surface 386 of the panel 380 appears as a backdrop 387 located or positioned behind the half-prop 230 as can be viewable in FIG. 3C in systems 300A, 300B, and 300C where the viewer 205 has viewing angles to the left, the center, and the right of the aperture 384. As the viewer 205 moves as shown in FIG. 3C, the backdrop 387 appears to have parallax with the prop 230 and displayed image/object 214, which expands the apparent depth of the 3D scene or effect.

While the system 300 is useful in many applications, it may, in some embodiments, be desirable to have backdrop imagery without a frame. With the solid panel 380 with rear-facing imagery on surface 384, the viewer 205 must look through a window or aperture 384, with that window frame 380 also appearing in the reflected background. The inventors recognized that a full aperture background image can be provided that appears behind the half-prop 230 and synthetic character/object 214 to add depth in the 3D illusion or effect. Particularly, the system 400 of FIGS. 4A-4C was designed, with components matching those from system 200 having like numbering and not described again in detail as being understood from the description of FIGS. 2A-2C.

Figure 4A:
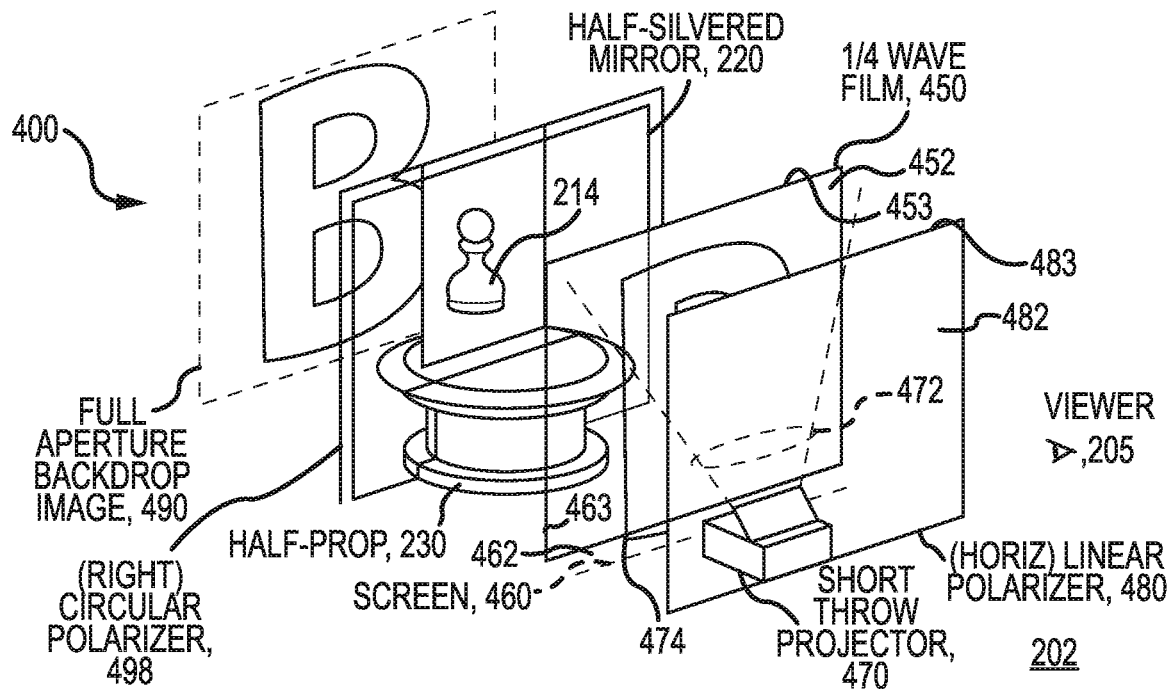
FIGS. 4A-4C are, respectively, a perspective view of an embodiment of a mirror-based 3D display system, similar to that of FIGS. 3A-3C but adapted to provide a backdrop without a framed aperture, during operation, a side view of the display system of FIG. 4A showing a ray tracing, and a front view or viewer perspective of the display system of FIGS. 4A and 4B.

As shown in FIG. 4A, the system 400 represents a modification of the system 200 in that the polarizer 240 is implemented using a ¼ wave film 450 (combined with horizontal polarizer 480 and circular polarizer 498) positioned between the mirror 220 and the viewing location 202 and with a first or outer surface 452 facing the viewing location 202 and a second or inner surface 453 facing the mirror 220. Typically, the film 450 is planar and is arranged to be parallel to the mirror 220. The system 400 further includes a transparent polarization preserving screen 460 positioned between the film/polarizer 450 and the viewing location 202 and oriented to be parallel to the film 450 with a first or outer surface 462 facing the viewing location 202 and a second or inner surface 463 facing the film 450.

Further, the system 400 includes a projector (e.g., a short throw projector) 470 projecting light 472 onto the first or outer surface 462 of the screen 460 to provide a projected image 474, and the projector 470 is positioned out of the line of sight of the viewer 205 (below or above or to the side of the screen 460). Additionally, the system 400 includes a (horizontal) linear polarizer 480 with a first or outer surface 482 facing the viewing location 202 and a second or inner surface 483 facing the first or outer surface of the screen 462. With concurrent operation of the display 210 and the projector 470, the viewer 205 observes the virtual image 214 on the prop's extended surface 231 and further depth is provided by a full aperture backdrop image 490 appearing to the viewer 205 to be in a location behind the prop 230.

Figure 4B:
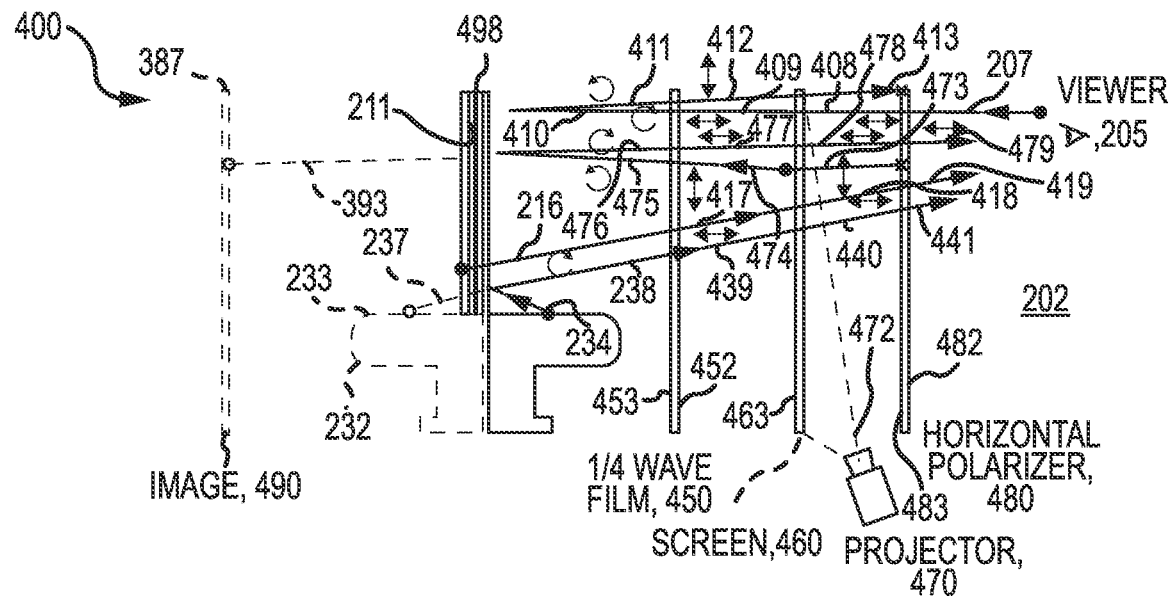
Figure 4C:
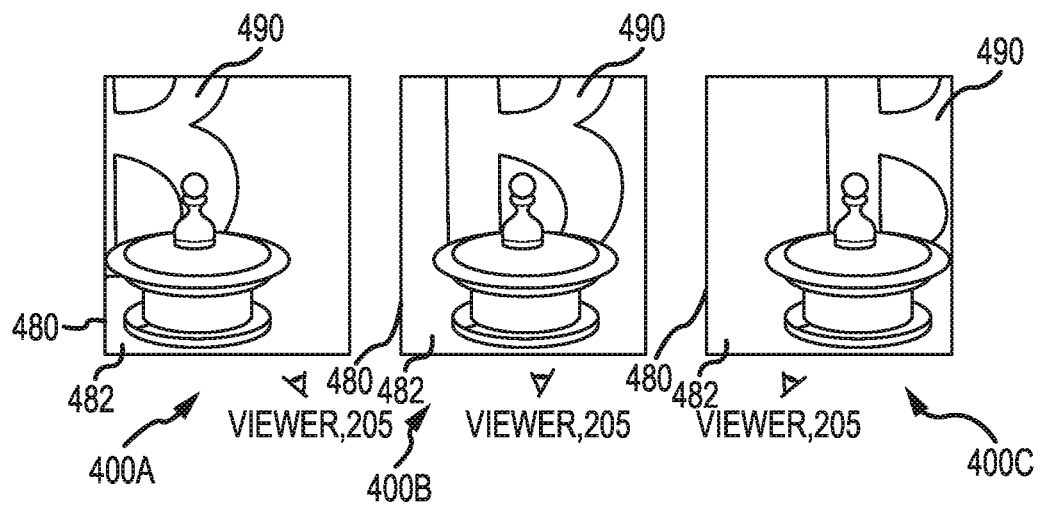

FIG. 4B provides ray tracings showing changes in polarization states that is useful in explaining how the 3D effect with a full aperture backdrop image and without viewer reflection is achieved with the system 400. First, with system 400, the viewer's reflection is blocked. This can be viewable with light 207 from the viewer 205 (or room/space 202) being randomly polarized when it strikes the first surface 482 of the horizontal polarizer and passes through as horizontally polarized light 408. The light 408 then strikes the first or outer surface 462 of the transparent polarization preserving screen 460 (e.g., holographic scrim, particle embedded transparent plastic, or other useful screen configuration/material) and passes through while remaining horizontally polarized light 409. The light 409 then strikes the first or outer surface 452 of the ¼ wave film and is passed through becoming right circularly polarized light 410. The light 410 then strikes the first or outer surface 222 of the mirror 220 and becomes left circularly polarized light 411. The light 411 strikes the second or inner surface 453 of the ¼ wave film 450 and passes through to become vertically polarized light 412. This light 412 strikes the second or inner surface 463 of the screen 460 and passes through remaining vertically polarized light 413, which is blocked by the horizontal polarizer 480 such that the viewer 205 is prevented from viewing their reflection.

With regard to the half-prop 230, light 234 from the prop 230 is randomly polarized (e.g., a combination of left and right circular polarization) and reflects off the mirror's first or outer surface 222 remaining randomly polarized light 238. Its reflection completes the image of the prop 230 as shown with line 237 and prop images 232, 233. The randomly polarized light 238 strikes the second or inner surface 453 of the ¼ wave film 450 and passes through the film 450 remaining randomly polarized light 439 (e.g., as a combination of horizontal and vertical polarization). The light 439 strikes the second or inner surface 463 of the screen 460 and passes through remaining randomly polarized light 440. This light 440 strikes the second or inner surface 483 of the horizontal polarizer 480 and passes through becoming horizontally polarized light 441, which is viewable by viewer 205.

With regard to the display 210, light from the display 210 passes through a circular polarizer 498 disposed between the display's screen 211 and the beam splitter 240 to become right circularly polarized light 216. The light 216 passes through the mirror 220 unchanged and strikes the second or inner surface 453 of the ¼ wave film 450 and is passed through to become horizontally polarized light 417. The light 417 then strikes the second or inner surface of the screen 460 and passes through the screen 460 remaining horizontally polarized light 418. The light 418 strikes the second or inner surface 483 of the horizontal polarizer 480, which passes it through as shown 419 for viewing by a viewer 205 in the space 202.

With regard to screen projection that is reflected, light 472 (e.g., vertically polarized light) from the projector 470 is projected onto the first or outer surface 462 of the transparent polarization preserving screen and remains vertically polarized. Some 473 is scattered toward the viewer 205 in the space 202 but is extinguished or blocked by the horizontal polarizer 480 such that the viewer 205 does not view this light 473.

With regard to screen projection transmitted, light 474 scattering from the screen 460 also travels away from the viewing location 202 or into the display system 400 and is also vertically polarized. The light 474 strikes the first or outer surface 452 of the ¼ wave plate and passes through becoming left circularly polarized light 475. A fraction of the light 475 striking the mirror 220 bounces off and becomes right circularly polarized light 476. The light 476 appears to come from a plane behind the half-silvered mirror 220, thus making a virtual image 490 of the projection displaying the extended set to the viewer 205.

The light 476 then passes through the ¼ wave film 450 to become horizontally polarized light 477. The light 477 passes through the polarization preserving screen as shown with light 478 that strikes the second or inner surface 483 of the horizontal polarizer 480, and all or a portion 479 passes through to the space 202 for viewing by viewer 205 (as a full aperture set extension image 490 behind the prop 220). The resulting effect can be viewable from three different perspectives for viewer 205 in FIG. 4C with systems 400A-400C.

Figure 5:
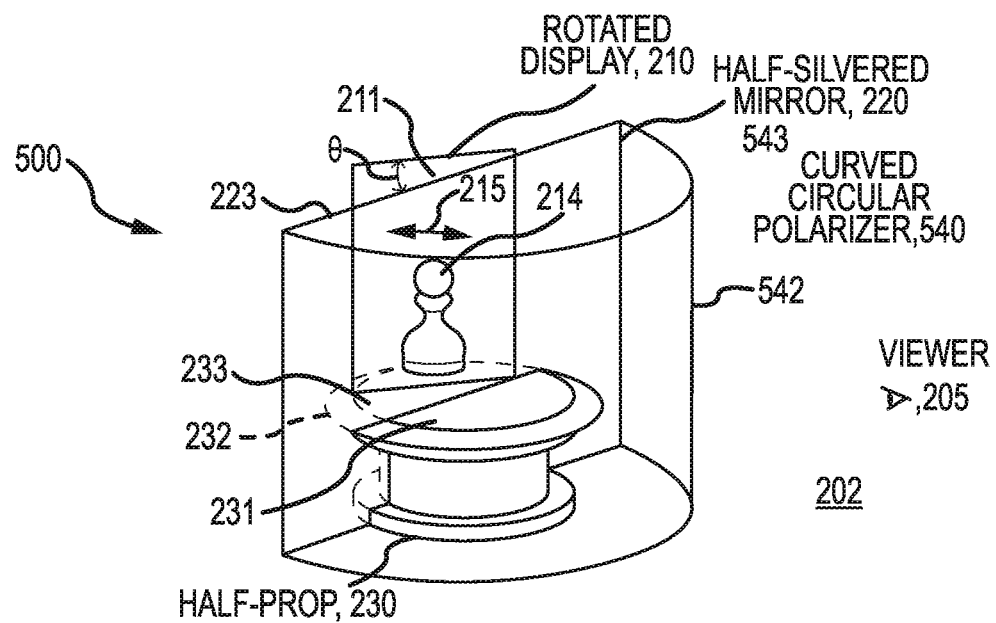
FIG. 5 illustrates a perspective view of an embodiment of a mirror-based 3D display system similar to that of FIG. 2A but utilizing a curved polarizer.

FIG. 5 illustrates a perspective view of an embodiment of a mirror-based 3D display system 500 similar to the system 200 shown in FIG. 2A. The system 500 differs in that the planar polarizer 240 is replaced with a curved polarizer 540, which may take the form of a circular polarizer shaped as a half or partial cylinder (arched or semi-circular cross section rather than a planar cross section). A first or outer surface 542 faces outward toward the viewing location 202 and viewer 205 while a second or inner surface 543 faces and wraps around the prop 230 and may have its ends/edges abutting the sides or side edges of the beam splitter 220 as shown in FIG. 5.

The curved circular polarizer 540 may be used rather than the flat polarizer 240 to reduce reflections off the polarizer's outer surface 542. The curved shape of polarizer 540 may also be used to make the effect to be viewable over a wider field of view and making the display system 500 more compact in size. In some cases, the circular polarizer 540 is applied to an internal container (not shown) for the half-prop 230 (such as one with windows or apertures in its walls) within a larger container (clear walls or again with windows or apertures in its walls). This embodiment is useful as it makes the object inside half full reflected roundness and the container outside simply having a black reflection.

Figure 6:
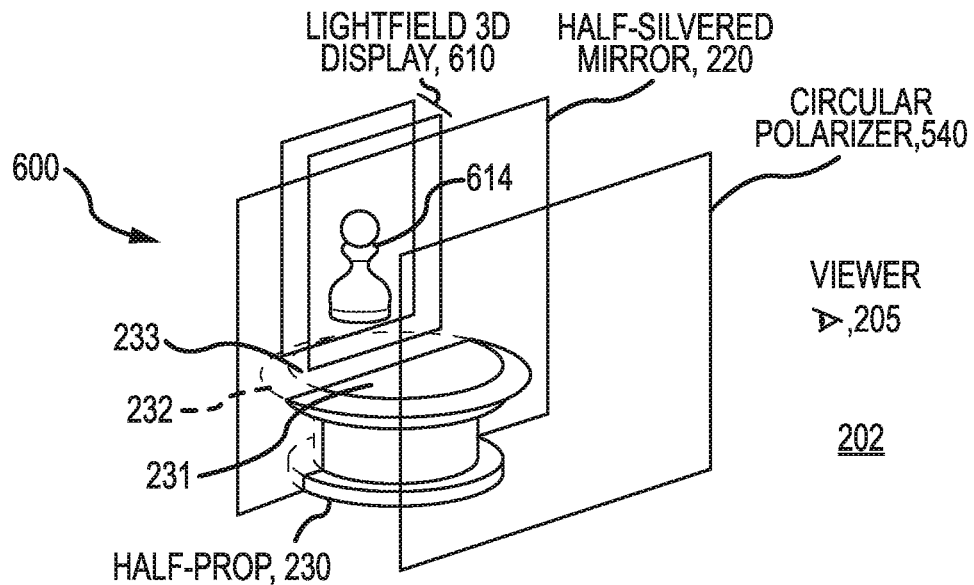
FIG. 6 illustrates a perspective view of another embodiment of a mirror-based 3D display system similar to that of FIG. 2A but utilizing a 3D autostereoscopic display.

FIG. 6 illustrates a perspective view of another embodiment of a mirror-based 3D display system 600 similar to the system 200 shown in FIG. 2A. The system 600 replaces the display 210 with a 3D display 610 operating to display a 3D image 614 on its monitor or display screen, which may be parallel to or rotated an offset angle from the second or inner surface 223 of the beam splitter 220 (as discussed relative to system 200 for display 210). The 3D display 610 may take a variety of forms to provide a 3D image 614 such as a light field display, a multi-layer display, or a volumetric display.

Figure 7:
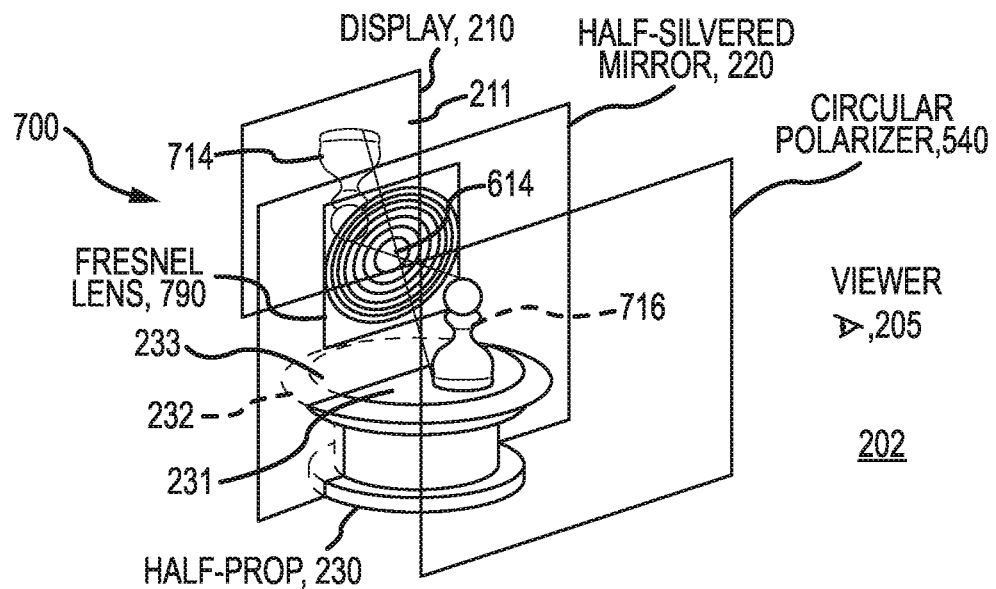
FIG. 7 illustrates a perspective view of another embodiment of a mirror-based 3D display system similar to that of FIG. 2A but utilizing a Fresnel lens to focus the displayed image onto a physical prop.

FIG. 7 illustrates a perspective view of another embodiment of a mirror-based 3D display system 700 that is similar to the system 200 of FIG. 2A except it utilizes a lens 790 (e.g., a Fresnel lens or the like) to focus a displayed image 714 (displayed upside down on screen/monitor 211 of display 210) at a plane on a physical prop (e.g., onto surface 231 of half-prop 230). The Fresnel lens 790 is disposed between the display screen/monitor 211 and second or inner surface 223 of the beam splitter 220 (e.g., to be parallel to the surface 223). The lens 790 is selected/configured, positioned, and oriented in the system 700 to relay the image 714 on the display 210 to appear as a real image 716 in front of the first or outer surface 222 of the half-silvered mirror 220 (e.g., on surface 231 of the prop 230).

FIGS. 8A-12 illustrate display systems that at least replace the beam splitter of the systems 100-700 with a beam splitter or selective light filter that reflects or passes light based on a characteristic of the light. For example, a selective light filter reflects light with a certain characteristic such as linear, circular, or random polarization and passes light with another characteristic such as an orthogonal linear, opposite-handed, or random polarization. In another example, a selective light filter passes or reflects light based on the wavelength of the light. For example, a selective light filter may pass narrow bands of wavelengths of light while reflecting light with a wavelength outside those bands. For example, the system 800 shown for example in FIGS. 8A and 8B replaces the partially silvered mirror with a selective light filter that selectively passes or reflects light based on the polarization. Similarly, the system 900 shown for example in FIGS. 9A and 9B uses a selective light filter that passes or reflects light based on one or more wavelengths or bands of wavelengths of the light.

Figure 8A:
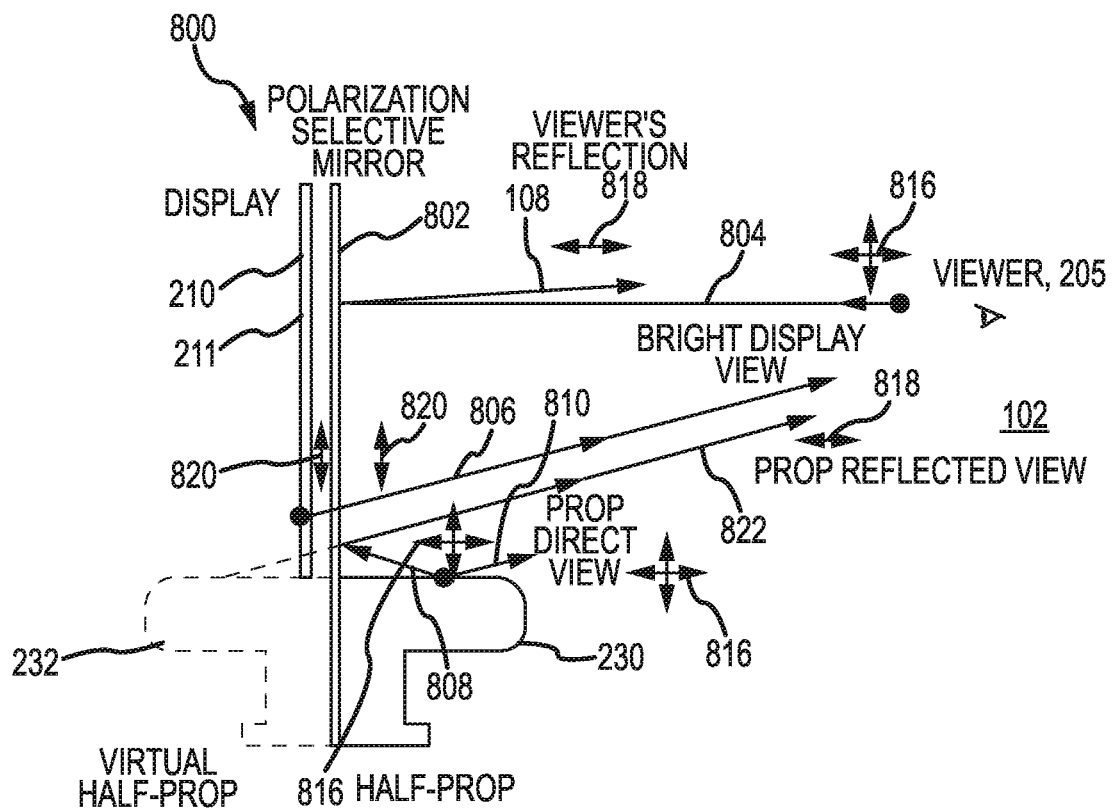
FIG. 8A illustrates a side view of an embodiment of a display system showing ray tracing of light in one example of operation of the system.
Figure 8B:
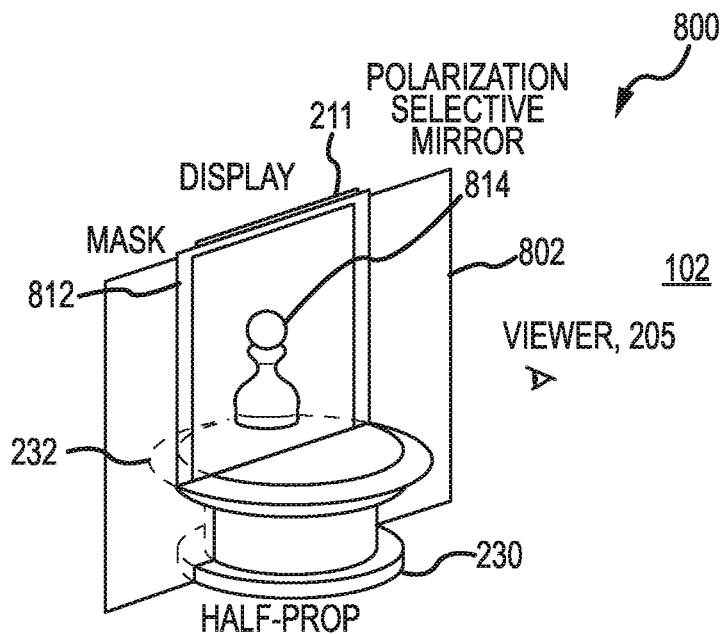
FIG. 8B illustrates a perspective view of the display system of FIG. 8A.

FIG. 8A illustrates a side view of an embodiment of a display system 800 showing ray tracing in one example of operation of the system. FIG. 8B illustrates a perspective view of the display system 800 of FIG. 8A. The display system 800 is adapted to increase display brightness compared to the systems 100-700. The system 800 replaces the half-silvered mirror beam splitter of the systems 100-700 with a selective light filter or beam splitter that selectively passes or reflects light based on the polarization of the light. In one example, the beam splitter of the system 800 is a polarization selective mirror 802 that passes light with a first polarization (e.g., vertical) and reflects light with a second polarization (e.g., horizontal). The system 800 is thus adapted to pass light from a display, which is already polarized such as by an internal polarizer, to provide an un-attenuated illusion viewable from a viewing location. In some embodiments, the polarization selective mirror 802 can replace an "internal" polarizer or analyzer of the display 210. For example, in an LCD panel, the backlight behind the liquid crystal cells has an initial polarizer. The liquid crystal cells can change (e.g., rotate) the polarization. A second polarizer (or analyzer) in front of the liquid crystal cells can change the polarization again. In some embodiments, the light emitted from an LED or OLED is polarized when it leaves the LED or OLED. Instead of adding a polarization selective mirror 802 after this stack of backlight/liquid crystal cells/analyzer, in some embodiments of the system 800. The polarization selective mirrors can instead replace the analyzer with the polarization selective mirror 802, since they both will pass, or not pass, light with a particular polarization. In some embodiments, the analyzer or polarization selective mirror 802 may absorb the light, rather than reflect it back into the display 210. Such absorption may be preferable to reduce unwanted stray light in the system 800.

The display system 800 includes a beam splitter such as a polarization selective mirror 802. The polarization selective mirror 802 passes, reflects, or blocks a portion of light incident on the polarization selective mirror 802 based on a characteristic of the light, e.g., based on a polarization of the light. In one example, the polarization selective mirror 802 is positioned between the display 210 and a viewing location 102 where an image 814 displayed by the display 210 is viewable by a viewer 202. In other words, light emitted from the display 210 must pass through the polarization selective mirror 802 before reaching the user.

In one example of the polarization selective mirror 802 is a linear polarization selective mirror (see FIG. 8A), but in other examples, the polarization selective mirror 802 is a circular polarization selective mirror or otherwise configured to selectively block light based on polarization characteristics. As with other systems disclosed herein, the display system 800 includes a half prop 230 and a display 210 with a screen 212 as previously described. In some examples, the half prop may be optional. In some examples of the system 800 a mask 812 is included to hide a portion of the display 210 such as a bezel.

As compared to systems 100-700 shown for example in FIGS. 1-7, a polarization selective mirror 208 replaces the half-silvered beam splitter, which acts to improve the brightness of the character's image 814 in the display 210. Unlike the half-silvered beam splitter that passes half of the light and reflects the other half of the light, the polarization selective mirror 802 substantially completely passes polarized light of one specific orientation (e.g., vertically polarized light 820), while substantially completely reflecting polarized light with the orthogonal orientation (e.g., horizontally polarized light 818). In this manner, the system 800, allows the user to view an un-attenuated image, whereas in instances where the half-silvered beam splitter is used, the image viewable to the user is at best half-brightness as compared to the original.

Typically, light emitted from display 210 such as an LCD and many organic light emitting display ("OLED") monitors is polarized in one orientation. As such, operation, a polarized image generated by the display 210 positioned behind the polarization selective mirror 802 passes through the polarization selective mirror 802 substantially un-attenuated, i.e., the polarized selective mirror 802 is selected to pass through light having the same polarization as the light emitted by the display 210. The viewer 202, positioned on the other side of the polarization selective mirror 802 from the display 210 in the viewing location is able to view a fully bright view of the image from the display 210. For example, if the light emitted from the display 210 is vertically polarized light 820, and the polarization selective mirror 802 is selected to allow vertically polarized light 820 to pass, the vertically polarized light 820 will pass to the viewing area substantially un-attenuated.

On the contrary, scene light scattered or reflected from the half prop 230 or other elements within the environment is randomly polarized light 816. For example, light 808 and light 810 reflected from the half prop 230 are randomly polarized light 816. The half prop 230 light 810 is viewable by the viewer 202 directly and un-attenuated because it is positioned in front of the polarization selective mirror 802. Randomly polarized light in the viewing location 102 is incident on the half prop 230. The light 808 scattered or reflected from the half prop 230 is incident on the polarization selective mirror 802. The horizontally polarized components of the light 808 are reflected back to the viewer as light 822. The vertical components of light 808 pass through the polarization selective mirror 802 and impinge on an anti-reflection or matte coating on the display 210 where the light is absorbed and is not directed back to the viewer 202 in any significant amount. Thus the light 822 completes illusion of the second half of the half prop 230 viewable as the virtual half prop 232.

The light 804 from the viewing location 102 incident and reflecting off of the viewer 202 is randomly polarized light 816. The vertical components of the light 804 pass through the polarization selective mirror 802 and impinge on an anti-reflection or matte coating on the display 210 where the light is absorbed and is not directed back to the viewer 202 in any significant amount. Thus, the viewer's reflection 108 is at least partially attenuated while maintaining full brightness of the display 210 as viewable by the viewer. The display system 800 creates the illusion of an un-attenuated virtual character image 814 in free-space on a symmetric virtual image 232 of the half prop 230.

Figure 9A:
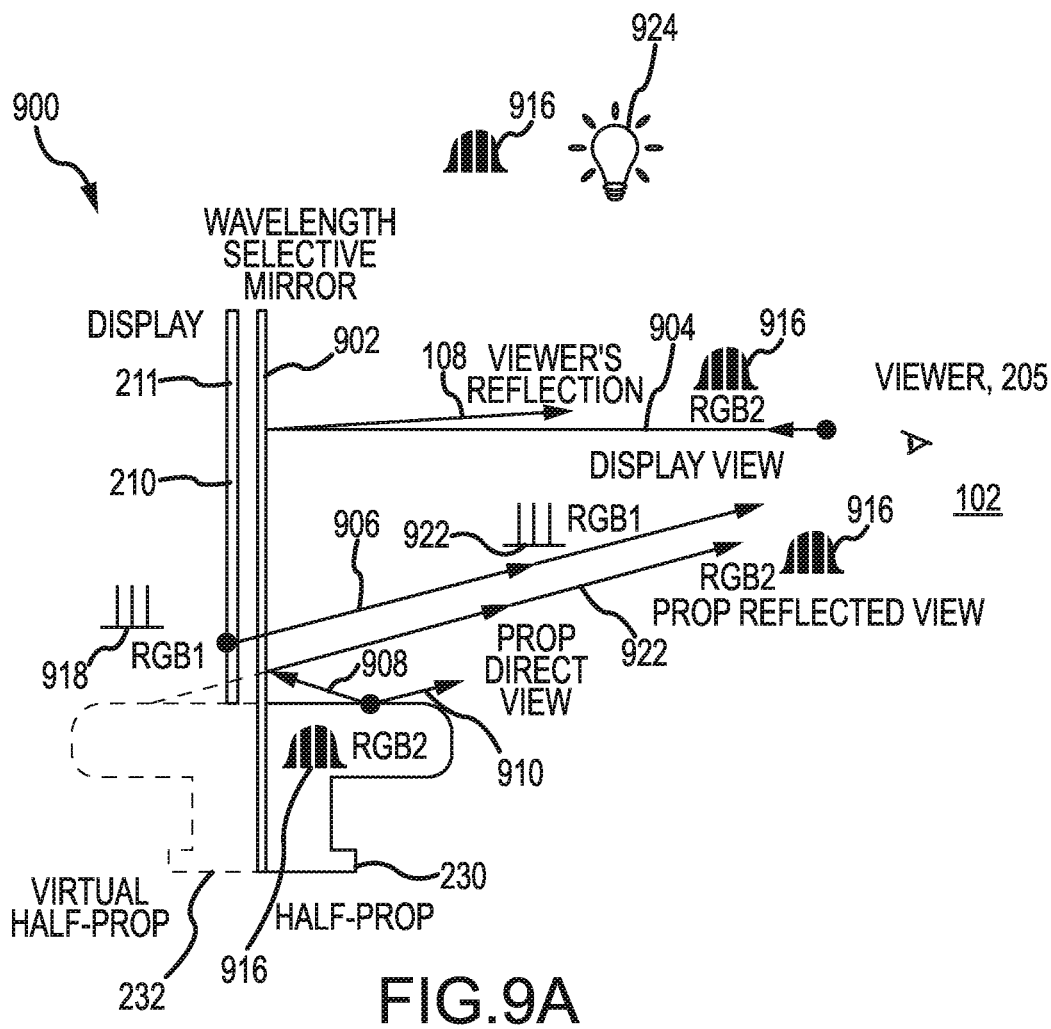
FIG. 9A illustrates a side view of an embodiment of a display system showing ray tracing of light in one example of operation of the system.
Figure 9B:
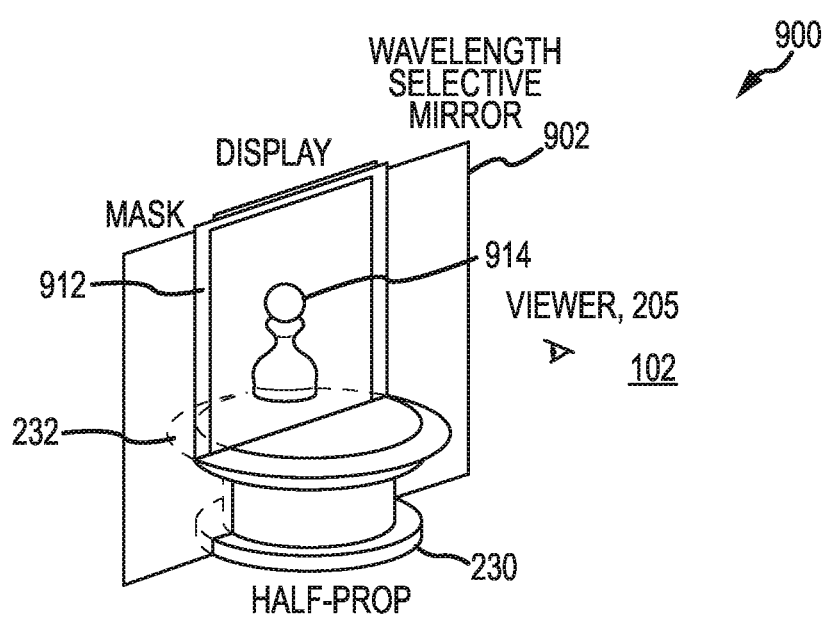
FIG. 9B illustrates a perspective view of the display system of FIG. 9A.

With reference to FIG. 9A and FIG. 9B, a display system 900 is disclosed. The display system 900 is similar to the display system 800 in many aspects, but the polarization selective mirror is replaced with a wavelength selective mirror 902 that passes or reflects light based on one or more wavelengths or ranges of wavelengths of the light in addition to or separate from the polarization of the light. In some examples, the wavelength selective mirror 902 is a holographic Bragg grating. For example, the display system 900 includes a display 210 with a screen 212, a half prop 230, a viewing location 102, and optionally a mask 912 to obscure a portion of the display 210. The display system 900 differs from the display system 800 in that the display system 900 uses a beam splitter such as a wavelength selective mirror 902. The wavelength selective mirror 902 passes, reflects, or absorbs light based on one or more wavelengths of the light 804 as opposed to the polarization selective mirror that selects light based on a polarization thereof. In one example, the wavelength selective mirror 902 is positioned between the display 210 and a viewing location 102 where a viewer 202 can view the display system 900.

In some examples, the viewing location 102 is illuminated with a broadband light spectrum (e.g., a span of light wavelengths substantially encompassing all or a portion of wavelengths viewable by a viewer 202. The viewing location 102 may additionally or alternately be illuminated by spectrally encoded light (RGB2) 916 for the viewer 202, the half prop 230 and display 210. The broadband light spectrum and/or spectrally encoded light (RGB2) 916 may be emitted by a light source 924 that illuminates the viewing location 102. The light source may be any suitable light source such as an incandescent lamp, one or more LEDs, one or more lasers, an arc lamp such as a high intensity discharge lamp or the like. The light source 924 may include one more filters, polarizers, or other elements to modify the light generated by the light source 924. The spectrally encoded light (RGB2) 916 may include a range of light wavelengths including wavelengths that may, or may not, be visible to the viewer 202, e.g., one or more spectral notches are removed from the wavelengths of light present in a broadband light spectrum. For example, certain bands of red, green, and/or blue light are omitted from the spectrally encoded light (RGB2) 916. In some examples, wavelengths of about 425 nm, 530 nm, 640 nm, or full width at half maximum ("FWHM") wavelength of about 15 nm-35 nm are removed from the spectrum. In one example, the spectrally encoded light (RGB2) 916 includes wavelengths of light spanning a range of light visible to the viewer 202 with one or more notches of light removed from the spectrum. The respective spectrums of light of the spectrally encoded peaks may correspond to respective spectrums of light of the one or more spectral notches omitted or removed from the broadband light spectrum.

In some examples of the system 900, the display 210 is a quantum dot OLED ("qOLED") monitor (or similar monitor or projection system) that emits narrow spectrally encoded light (RGB1) 918 with color components having narrow spectral peaks (e.g., 425 nm, 530 nm, 640 nm, or FWHM wavelength of about 15 nm-35 nm). The spectral peaks of the narrow spectrally encoded light (RGB1) 918 correspond to the notches omitted from the spectrally encoded light (RGB2) 916. The spectral peaks of the narrow encoded light (RGB1) 918 may be a subset of the wavelengths of the broadband light spectrum or the spectrally encoded light (RGB2) 916. The light 906 from the display 210 may be polarized, e.g., linearly or circularly polarized, such as inherently due to a component in the display 210 or polarized with a separate or integrated polarization element.

The viewer 202 and viewing location 102 are illuminated by light with a broadband spectrum of light or a spectrally encoded light (RGB2) 916 complimentary to the narrow spectrally encoded light (RGB1) 918 emitted by the display 210 (e.g., a broadband spectrum with notches corresponding to the display's 210 spectral peaks). The spectrally encoded light (RGB2) 916 can be mixed and corrected so the viewing location 102 appears properly illuminated and color balanced. For example, the wavelength selective mirror 902 may knock out certain wavelengths/colors of the light from the light source 924. As a result, the color balance of light reflected off, or passing through, the wavelength selective mirror 902 may be different than desired compared to a full-spectrum image. For example a white region may no longer appear white. Such side effects may be corrected, for example, by rebalancing the color by mixing different combinations of the color components so the image looks white again. The wavelength selective mirror 902 passes the narrow spectral peaks of the narrow spectrally encoded light (RGB1) 918, but reflects the complimentary broadband spectrum (with notches removed by the wavelength selective mirror 902) of the spectrally encoded light (RGB2) 916 from the viewer 202 and viewing location 102 illumination. The narrow spectrum image 914 from the display 210 behind the wavelength selective mirror 902 passes through substantially un-attenuated, and the viewer 202 views a fully bright view of the image 914, enhancing the display effect and visual appearance to the user. Scene light 910 and light 908 scattered from the half prop 230 is broadband spectrum or spectrally encoded light (RGB2) 916. The half prop 230 viewable directly by the viewer 202 is un-attenuated. The light 908 from the half-prop also impinges on the wavelength selective mirror 902, where the complimentary spectrum light 922 (broadband w/notches removed) is reflected back to the viewer 202. If the illumination in the viewing location 102 is full or broadband spectrum, the spectral bands corresponding to the notches pass through the wavelength selective mirror 902 and impinge on the antireflection or matte coating on the display 210 are absorbed or diffused, and are thus not specularly directed back to the viewer 202 in any significant amount.

The light 904 falling on the viewer 202 in the viewing location 102 may be spectrally encoded light (RGB2) 916 or broadband light. The spectral notches of the light 904 reflecting from the viewer 202 pass through the wavelength selective mirror 902 and impinge on an anti-reflection or matte coating on the display 210 where the light is absorbed or diffused and is not directed back to the viewer 202 in any significant amount. Thus, the viewer's reflection 108 is at least partially attenuated (is missing the wavelengths associated with the notches) while maintaining full brightness of the display 210 as viewable by the viewer. The display system 900 creates the illusion of an un-attenuated or fully bright virtual character standing in free-space on a symmetric prop.

Figure 10A:
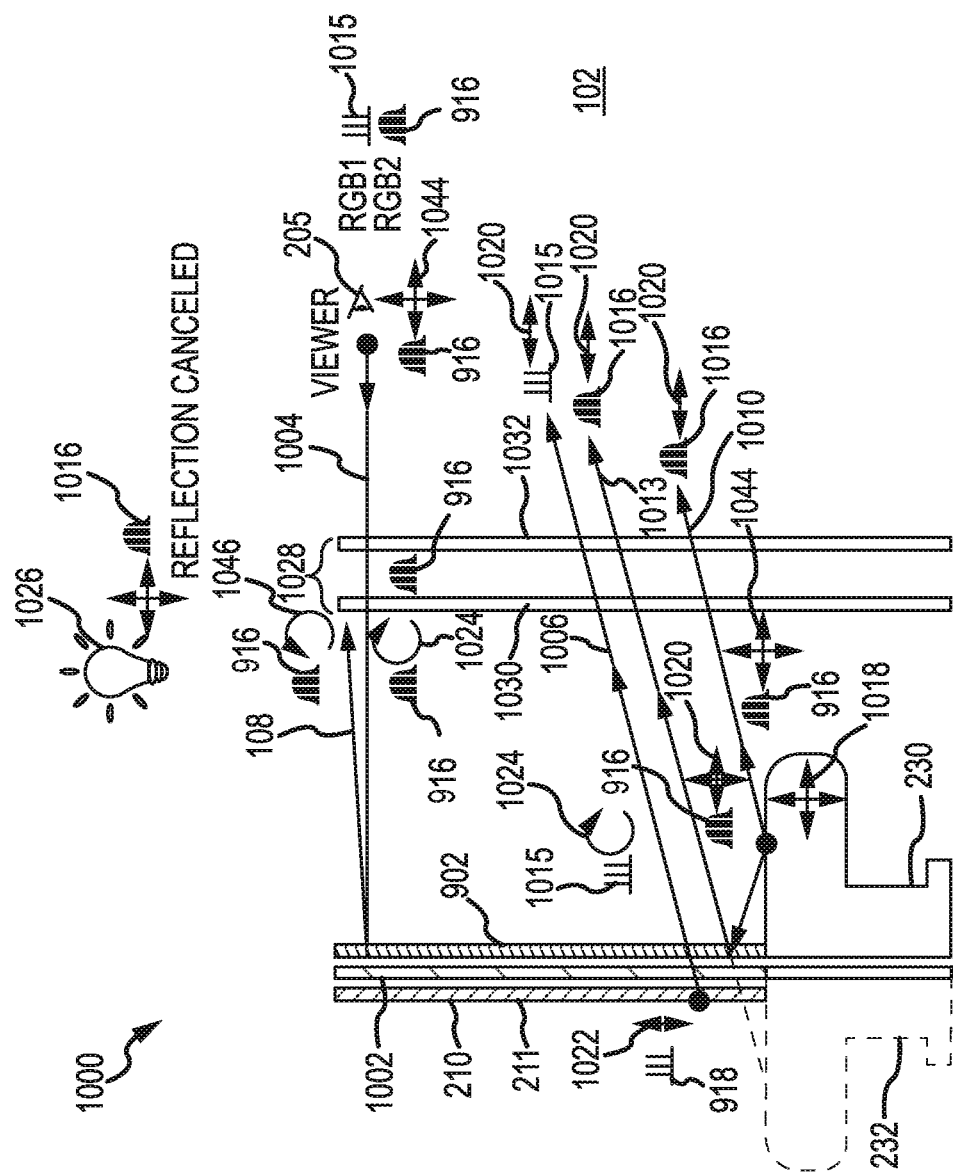
FIG. 10A illustrates a side view of an embodiment of a display system showing ray tracing of light in one example of operation of the system.
Figure 10C:
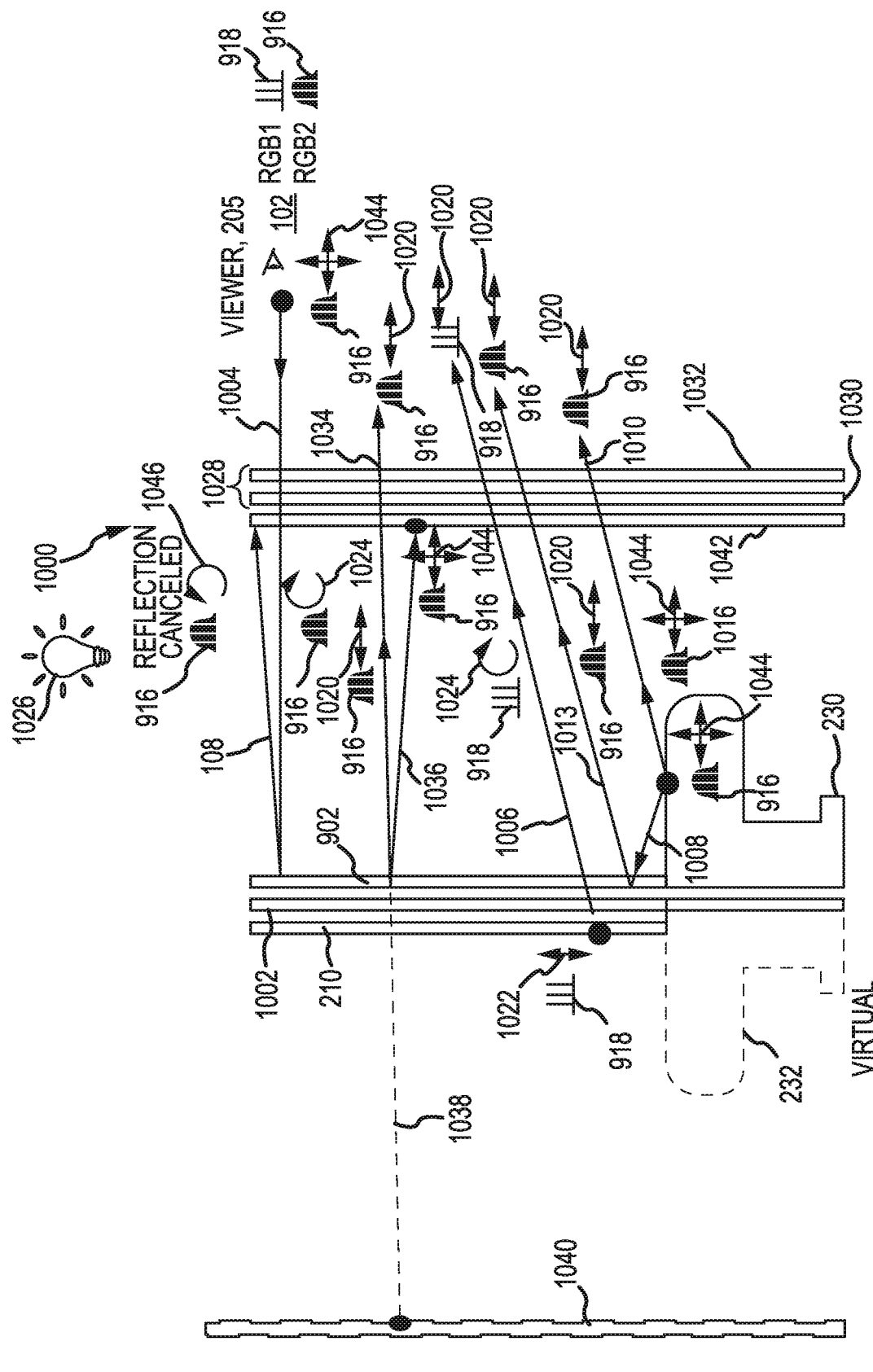
FIG. 10C illustrates a side view of the display system of FIG. 10A with a backdrop.
Figure 10D:
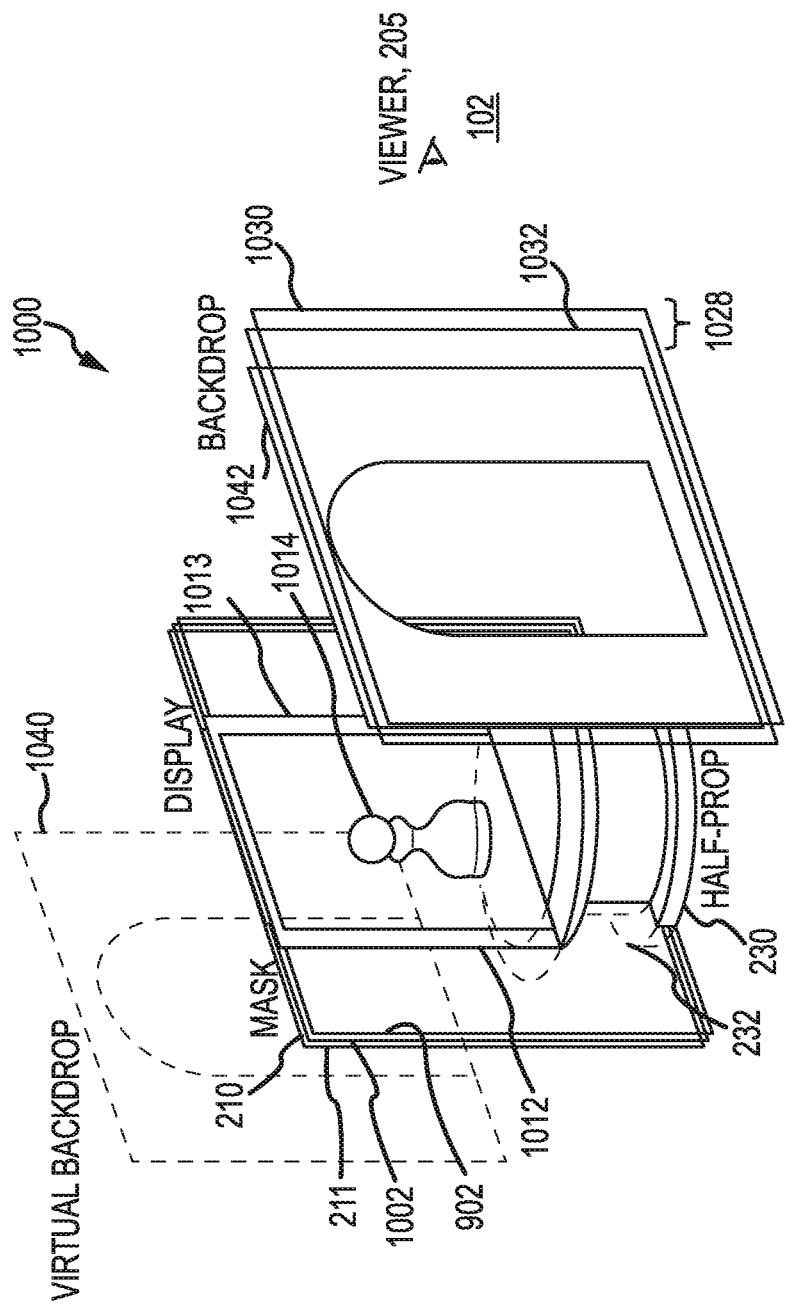
FIG. 10D illustrates a perspective view of the display system of FIG. 10C.

With respect to FIG. 10A-FIG. FIG. 10D, a display system 1000 is disclosed. The display system 1000 is similar to the display systems 800 and 900 is some aspects such as using a wavelength selective mirror. The display system 1000 includes additional elements to substantially cancel the viewer's reflection from being reflected off the elements of the system to the viewing location 102. The display system 1000 differs from the systems 800 and 900 in that the system 1000 includes a polarizing element 1028 that cancels the viewer's reflection to substantially prevent the viewer from viewing their reflection in the viewing area 102. In some examples, the polarizing element 1028 is a quarter wave plate 1030 and a linear polarizer 1032 (or equivalent circular polarizer). Light passing through the polarizing element 1030 in a direction such that it encounters the linear polarizer first (e.g., from the viewing location toward the display 210) becomes linearly polarized. The linearly polarized light then encounters the quarter wave plate 1030 and becomes circularly polarized. Randomly polarized light passing through the polarizing element 1030 in an opposite direction such that the light encounters the quarter wave plate 1030 first (e.g., from the display toward the viewing location) will remain randomly polarized after passing through the quarter wave plate 1030. The randomly polarized light with then encounter the linear polarizer 1032 and become linearly polarized. The polarizing element is placed between the wavelength selective mirror 902 and the viewing location 102 to cancel the viewer's reflection. The system 1000 also includes a half wave element/quarter wave element combination 1002 between the display 210 and the wavelength selective mirror 902. The half wave element/quarter wave element combination 1002 may be a half wave/quarter wave plate. The display system 1000 includes a display 210 with a screen 212, a mask 1012, a half prop 230, a viewing location 102, and optionally a mask 100 to obscure a portion of the display 210.

The viewing location 102 may be illuminated by a light source 924 as previously described, with a broadband light spectrum or a spectrally encoded light (RGB2) 916. As with the display system 900, in some examples, the display 210 of the display system 1000 is a qOLED display that emits narrow spectrally encoded light (RGB1) 918 with color components having narrow spectral peaks (e.g., 425 nm, 530 nm, 640 nm, or FWHM wavelength of about 15 nm-35 nm). The display 210 may also include a linear polarizer such that the display 210 emits polarized light, as previously described. In some examples, the narrow spectrally encoded light (RGB1) 918 is vertically polarized light 1022. The display system 1000 is adapted to retain substantially full display brightness while substantially canceling the viewer's reflection 108. The display system 1000 includes a circular polarizer 1028. The polarizing element 1028 may be a circular polarizer 1028 formed from a combination of a quarter wave plate 1030 and a linear polarizer 1032 or may be an equivalent circular polarizer. The polarizing element 1028 is positioned between the wavelength selective mirror 902 and the viewer 202. The display system 1000 includes a half wave element/quarter wave element combination 1002 positioned between the display 210 and the wavelength selective mirror 902. In systems 100-700 a polarizer and quarter wave film/plate (or equivalent circular polarizer) were added to remove the viewer's reflection 108. Such a system is incompatible with the use of a polarization selective mirror 802 in the display system 800, instead of half-silvered mirror in the systems 100-700 because the polarization selective mirror passes the light from the display 210 and reflects the light from the prop 230. For example, the display 210 light and prop 230 light are orthogonal to each other after the polarization selective mirror 802. Both the light from the display 210 and the prop 230 must have the same polarization to pass through the circular polarizer used to cancel the user's reflection. With the light from the display 230 and the prop 210 being orthogonal to one another, one or the other would be canceled, ruining the illusion. The systems 100-700 use polarized light (including both vertical and horizontal polarized light) from the viewer 202 to reflect off the beam splitter. Unlike a beam splitter, the polarization selective mirror 802 only reflects one orientation of polarized light (e.g., horizontally linearly polarized light).

The use of a polarizing element 1028 to remove the viewer's reflection 108 is, however compatible with the use of a wavelength selective mirror 902 instead of the half-silvered mirror or polarization selective mirror 802, as the wavelength selective mirror 902 will pass the narrow spectrally encoded light (RGB1) 918 display image 914, and reflect spectrally encoded light (RGB2) 916 (regardless of polarization) from illuminated half prop 230 and viewer 202.

The display system 1000 arrangement of display 210, half wave element/quarter wave element combination 1002, wavelength selective mirror 902, quarter wave plate 1030, and linear polarizer 1032 (or quarter wave plate 1030 and linear polarizer 1032 combined into equivalent circular polarizer 1028) allows the display's 210 light 1006, e.g., narrow spectrally encoded light (RGB1) 918 to pass unattenuated to the viewer 202. The half wave plus quarter wave element combination 1002 causes the display's 210 linearly (e.g., vertically or horizontally) polarized light to be circularly (e.g., right) polarized into circularly polarized light 1024 which can then pass through the polarizing element 1028 to be viewable by the viewer 202.

The display system 1000 prevents the viewer's reflection 108 from being viewable by the viewer 202. The light 1004 scattered from the viewer 202, is initially randomly polarized light 1044. The light 1004 is linearly polarized (e.g., vertically or horizontally) by the linear polarizer 1032 and as the light passes through quarter wave plate 1030 it becomes circularly polarized (e.g., right). The viewer's light 1004 then is reflected as reflection 108 by the wavelength selective mirror 902, and becomes oppositely circularly polarized (e.g., left) circularly polarized light 1046. For example, the quarter-wave plate 1002 shifts the in-phase horizontal and vertical linearly polarized light to be 90 degrees out of phase with respect to one another, so the light 1046 becomes circularly polarized. Passing again through the quarter wave plate 1030, the reflection 108 becomes orthogonally (e.g., horizontally) linearly polarized to the initial (e.g., vertically) linear polarization. The initial (e.g., vertical) linear polarizer 1032 cancels the orthogonal (e.g., horizontally) polarized light of the viewer's reflection 108.

The display system 1000 allows the viewer 202 to directly view the half prop 230 in front of the wavelength selective mirror 902. The half prop 230 is a set piece or object illuminated by and will scatter the spectrally encoded light (RGB2) 916 as light 908 and/or light 910. The light 910 is directed to the viewing location 102 directly, whereas the light 908 may bounce off the wavelength selective mirror 902 before being directed back to the viewing location 102. The scattered light 910 may be randomly polarized, such as due to the scattering. On the way to the viewer 202 from the half prop 230, the light 910 is randomly polarized light 1044 and pass through the quarter wave plate 1030, and remain randomly polarized. The light 910 then passes through the linear polarizer 1032, where half the (e.g., the horizontally polarized component) of the light 910 will be rejected, and the remaining (e.g., vertically polarized component) light will pass through to become linearly polarized (e.g., vertically polarized light 1020) and viewable by the viewer 202 as light 1010.

Similarly, the display system 1000 allows the viewer 202 to view the reflection of the half prop 230 in the wavelength selective mirror 902. The light 908 scattered from the half prop 230 and directed toward the wavelength selective mirror 902 is randomly polarized light 1044 and may also be spectrally encoded light (RGB2) 916. The light 908 will reflect off the wavelength selective mirror 902, and remain randomly polarized. The light 908 then passes through the quarter wave plate 1030 and remains randomly polarized. The light 908 then passes through the linear polarizer 1032, where half the (e.g., horizontally polarized component) light will be rejected, and the remaining (e.g., vertically polarized component) light will pass through to become polarized (e.g., vertically polarized light 1020) and viewable by the viewer 202, as a reflection in the wavelength selective mirror 902 completing the illusion of a symmetrical prop. The light 908, 910, 1010, and/or 1013 may be narrow spectrally encoded light (RGB1) 918 in addition to being vertically polarized light 1020.

As shown in FIG. 10C and FIG. 10D, an embodiment of the display system 1000 including a backdrop is disclosed. With embodiment of the display system 1000 as discussed with respect to FIG. 10A and FIG. 10B, the viewer 202 will not view their own reflection as described above but neither will they view a backdrop behind the character (only a black void). The display 210 and its mask 313 block the view through the display 210 to a real background. The image 1014 will appear to be on a floor or similar symmetrically reflected half prop 230.

To provide a virtual backdrop 1040 behind the image 1014, a physical backdrop 1042 may be provided behind the polarizing element 1028 relative to the viewer 202. In some examples, the backdrop 1042 is illuminated with randomly polarized light 1044 not directly visible to the viewer 202 (e.g., is screened from the viewer 202 by the circular polarizer 1028), but directed towards the wavelength selective mirror 902 as light 1036. After reflecting off the wavelength selective mirror 902, the backdrop 1042 image's light 1036 will still be randomly polarized, and travel through the polarizing element 1028 becoming linearly polarized and viewable by the viewer via light 1034 as a virtual backdrop 1040 some distance 1038 behind (and around) the image 1014 and/or the display 210. For example, light passing through the polarizing element 1028 from the rear thereof, toward the viewing area, will hit the quarter wave plate 1030 first which keeps randomly polarized light randomly polarized. When this randomly polarized light passes from the quarter wave plate 1030 and hits the linear polarizer 1032, the randomly polarized light becomes linearly polarized light 1020.

To provide a full aperture backdrop (i.e., a backdrop that occupies substantially all of the display 210) behind the image 1014, an image of the backdrop 1042 is projected onto a transparent screen (e.g., a holographic film or similar) located behind the circular polarizer 1028. The projected light may be circularly (e.g., left) polarized orthogonal to the circular polarizer (e.g., right) near the viewer, such that projected blow-by light though the screen will be absorbed or cancelled by the linear polarizing element 1028 and not viewable by the viewer 202 directly. With the appropriate transparent screen, a majority of the circularly polarized (e.g., left) image light is directed towards the wavelength selective mirror 902, and reflected back towards the viewer 202 as the opposite/orthogonal handedness (e.g., right) of circularly polarized light. The image light will be able to pass through the transparent screen and through the polarizing element 1028 (e.g., right) to be viewable by the viewer 202 as a virtual backdrop 1040 some distance 1038 behind the image 1014 and able to occupy substantially the entire display area. (i.e., be a full aperture backdrop 1042).

Figure 11A:
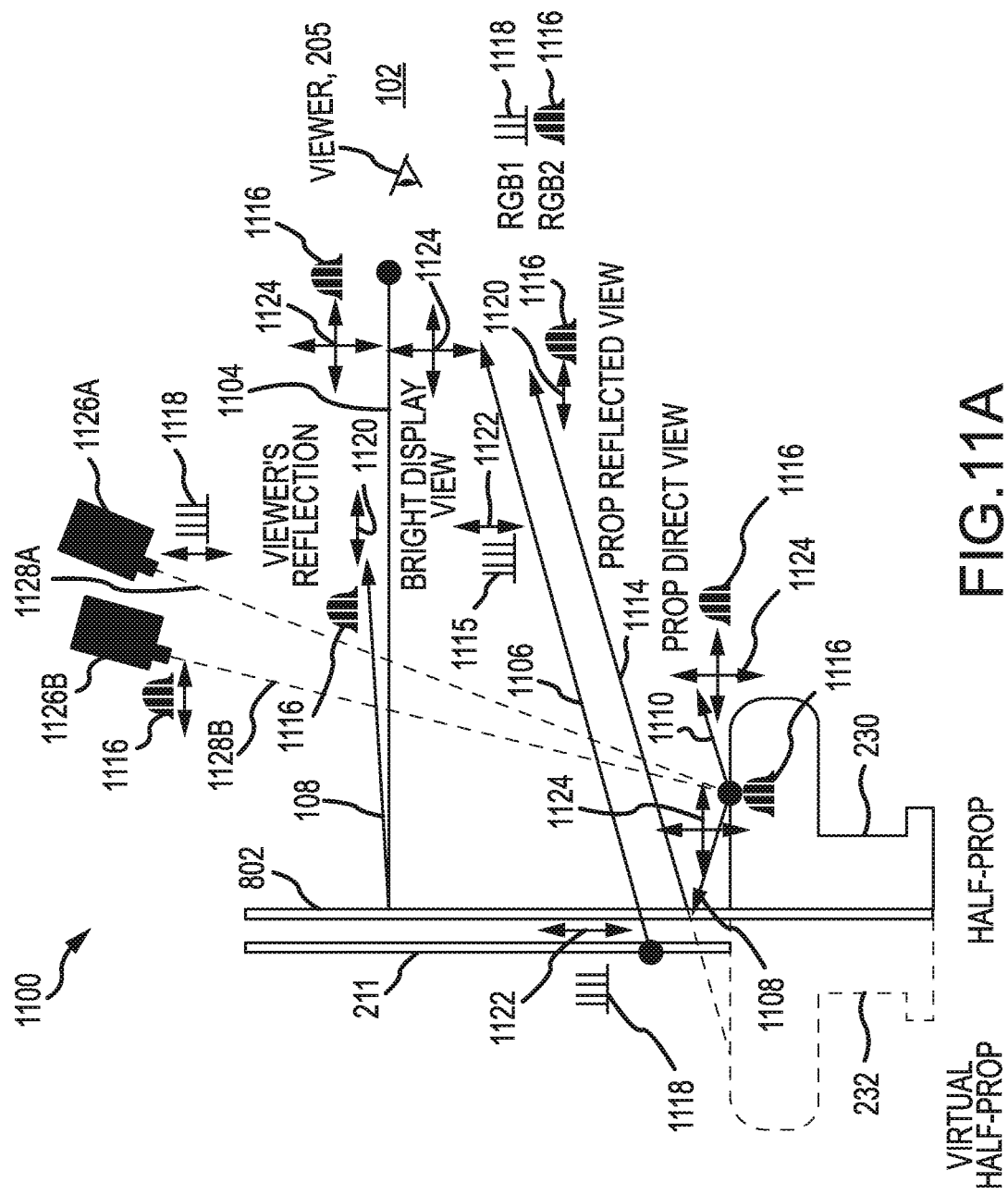
FIG. 11A illustrates a side view of an embodiment of a display system showing ray tracing of light in one example of operation of the system.
Figure 11B:
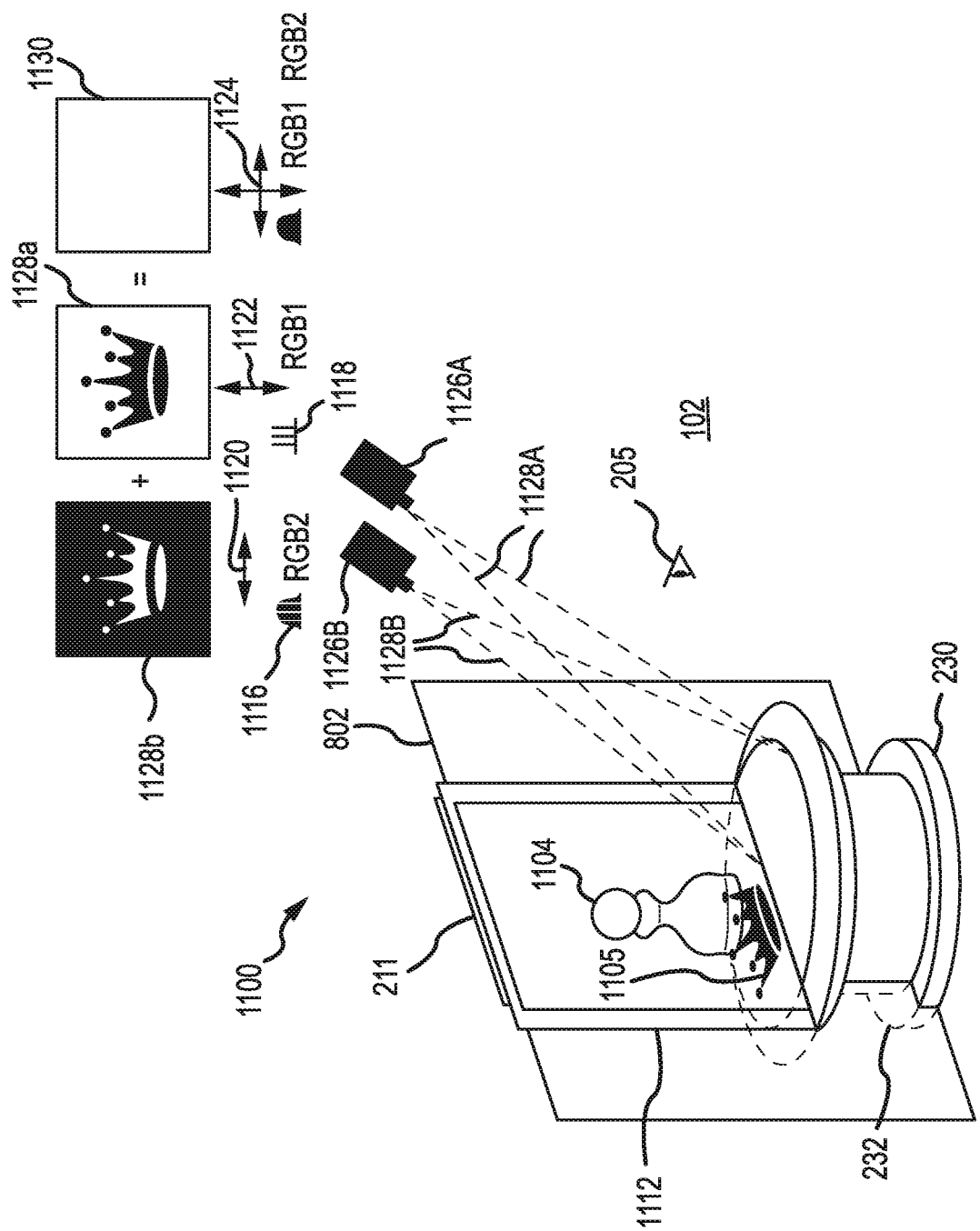
FIG. 11B illustrates a perspective view of the display system of FIG. 11A.
Figure 12:
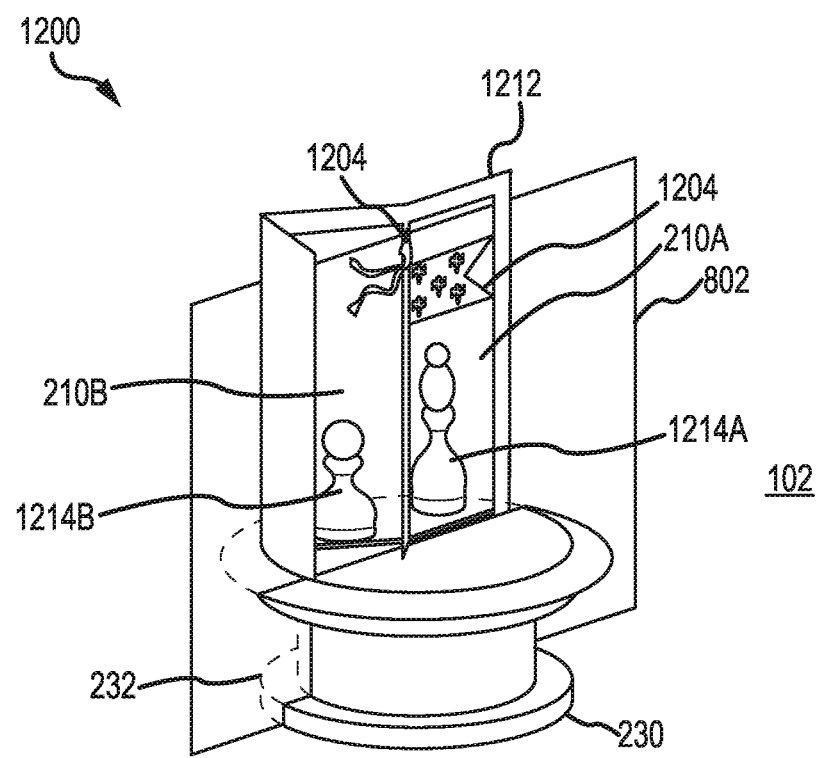
FIG. 12 illustrates a side view of an embodiment of a display system showing ray tracing of light in one example of operation of the system.

In FIG. 11A and FIG. 11B, an embodiment of the display system 1100 is disclosed, the display system 1100 may be similar to display system 800 but includes one or more projectors 1126A and 1126B to project complementary light images 1128*a/b* so as to display different images on front of the half prop 230 and the reflection of half prop 230 (i.e., the virtual half prop 232). The projectors 1126 A/B may be laser projectors, LCD projectors, Digital Light Processor projectors, light sources with a filter, or the like. For example, the display system 1100 includes a polarization selective mirror 802, a display 210, a mask 1112, viewing location 102, etc. The viewing location 102 may be illuminated with randomly polarized light 1124. For example, the display system 1100 includes a projector 1126*a* and a projector 1126*b* that can display or project respective complementary light images 1128*a/b* so as to display different images on front of the half prop 230 and the reflection of half prop 230 (virtual image 232 of the half prop 230), so the half prop 230 does not look like it has a symmetrical texture. The direct view 1110 of the half prop 230 appears as a combined image 1130 of complementary light image 1128*a* and complementary light image 1128*b*. Light 1108 reflecting from the half prop 230 toward the polarization selective mirror 802 is reflected as a reflected view 1114 of the half prop 230 and appear as complementary light image 1128*a*. When a polarization selective mirror 802 is used as the beam splitter, the complementary light image 1128*a* may be projected or displayed using linearly polarized light 1122 (e.g., vertically). Complementary light image 1128*b* may be displayed using linearly polarized light 1120 polarized orthogonally to the linearly polarized light 1122 (e.g., horizontally). To retain the polarization, projectors 11266*a/b* project respective complementary light image 1128*a/b* onto a polarization-preserving screen/paint on the half prop 230 (e.g., metalized paint, a polarization print (printed patterned micro-polarizers and quarter wave plate dots over ink, to provide different image and animation effects when viewed through a rotating polarizer).

In some embodiments, a display with its polarizer/analyzer removed may be used as an active half prop 230. The direct view 1110 of the active half prop 230 prop appears white, but the when reflected by the polarization selective mirror 802, the complementary light image 1128*a* (e.g., the image sent to the LCD) appears as the reflected view 1114. Similarly, when a wavelength selective mirror 902 is used as the beam splitter, the complementary light image 1128*a* may be projected or displayed using narrow spectrally encoded light (RGB1) 1118, and complementary light image 1128*b* may be projected using a broadband light spectrum or spectrally encoded light (RGB2) 1116 (e.g., broadband light with notches removed). Six-component color light (e.g., a combination of spectrally encoded light (RGB2) 1116 and narrow spectrally encoded light (RGB1) 1118). An OLED monitor on the half prop 230 could also be used to provide complementary light image 1128*a* and complementary light image 1128*b*.

As discussed with respect to the display system 800, the light 1104 reflecting off the viewer, reflects off the polarization selective mirror 802 and linearly polarized light 1120, thus at least partially attenuating the viewer's reflection 108.

Light 1106 from the display 210 may be linearly polarized light 1122 that passes through the polarization selective mirror 802 to maintain a substantially fully bright view of the display 210.

With respect to FIG. 12A, a display system 1200 adapted to improve the apparent depth and/or volume of the displayed image 1214a and/or image 1214b is disclosed. The display system 1200 may be similar to other display systems disclosed herein but may use multiple displays 210A/B to add depth and/or volume to the illusion. To increase the apparent volume of the images 1214a/b, multiple displays 210a/b are used behind the beam splitter (i.e., a polarization selective mirror 802 or wavelength selective mirror 902). The displays 210a/b may be canted in different orientations to the beam splitter so the images 1214a/b may appear to travel along multiple planes and change directions (horizontally, vertically, and in depth) in the scene. The displays 210a/b may be abutted to one another or may be separated in space. In some embodiments, the displays 210a/b may be coupled to a mechanism to move the monitors in space (vertically, horizontally, tilt, rotation, and/or in depth). The bezels of abutting displays 210a/b often leave a gap between the images 1214a/b, thus breaking the illusion if a character is located or moves past the gap. If the seam is located at the beam splitter (i.e., a polarization selective mirror 802 or wavelength selective mirror 902), half props 1204 may be located in front of the bezel to hide the seam and occlude a portion of an image 1214a/b making it appear as if a character is behind or has moved behind the half props 1204. The display system 1200 may include a mask 1212 that masks an area behind the one or more displays 210a/b.

Some embodiments of display systems disclosed herein may be adapted to improve perspective of displays used therein. By using a raked stage, the perspective of live performers captured and displayed on the display's monitor may be naturally (and automatically) corrected appropriately, regardless of where they move in depth. Their image in the display will be the correct size and perspective for their position, and their (virtual) feet appear to remain on the surface of the half-prop. For example, in the display systems disclosed herein, when the display 210 is placed above or below the eye level of a viewer 202, when a character on the display moves back from the beam splitter, the perspective changes and a character may appear to float above, or be below, the virtual image 232 of the half prop 230. To counteract this effect, an actor, character, and/or prop may be positioned on a canted stage. For example, if the display 210 is below the eye level of the viewer 202, the stage on which an image of a character is recorded may be sloped backward from the camera. Similarly, if the display 210 is above the eye level of the viewer 202, the stage on which an image of a character is captured may be sloped upward from the camera. Such canting of the stage automatically corrects the perspective view of a character when displayed on a display 210 of any display system disclosed herein such that a character appears appropriately places with respect to the virtual image 232.

Some embodiments of display systems disclosed herein are adapted to improve viewing angles of displays used therein. Displays often direct light forward, getting dimmer and washed out for larger viewing angles off center of the display. Viewers tend to be spread or moving horizontally within a small vertical range (e.g., due to height differences). To increase the horizontal viewing angle, so the images appear at a consistent brightness, a prism film may be placed on the display to diffuse the light horizontally increasing the viewing angle horizontally, and also redirecting and concentrating the light vertically toward the range of viewer's eyes.

Some embodiments of display systems disclosed herein are adapted to use 3D images and a curved polarizer. For example, the 2D display may be replaced by a 3D display such as a light field display, a multilayer display, or a volumetric display or the like. A lens behind the beam splitter can relay the image of the display to appear as a real image in front of the beam splitter. A curved circular polarizer could be used rather than a flat polarizer, thus reducing reflections off the polarizer surface, making the effect viewable over a wider field of view, and making it appear more compact. The circular polarizer can be applied to an internal half-prop "container" within a larger container, making the object inside half full reflected roundness and the container outside simply have a black reflection.

In display systems disclosed herein may use a polarizer with a polarization direction orthogonal to a direction discussed. In other words, vertical and/or horizontal polarization may be used in lieu of one another with appropriate changes made to the system such that orthogonal polarizations remain orthogonal with respect to one another. Similarly, the handedness (e.g., left or right) of circular polarizers may be used in lieu of one another with appropriate changes made to the system such that opposite handed polarizations remain opposite with respect to one another As discussed with respect to the display systems 800-1200, the use of a polarization selective mirror or a wavelength selective mirror to replace the half-silvered mirror beam splitter creates a relatively higher contrast, brighter virtual character without the need to overly increase the monitor's brightness and black levels. The display systems 800-1200 better integrate a virtual character into the physical set than previous systems.

Especially when used with an OLED display, the low black levels of the display remove haziness and halos present in the previous displays, and also removes the need for feathered masks to blend and hide the edges of the display into the set. The use of a wavelength selective mirror, wave plates/films, and polarizers, allows the display to have both the benefit of full-brightness virtual characters, as well as, the ability to cancel the undesired reflections of the environment or viewer in the mirror, which can ruin the illusion.

Additionally, systems such as the display system 1100 may enable asymmetric textures on the physical half-prop 230, helping to hide the illusion and presence of the beam splitter, as well as to add visual interest. Systems disclosed herein may be able to realize substantially full-brightness virtual characters while maintaining other capabilities of the previously disclosed display: full-aperture virtual backgrounds adds parallax and increases the illusion the virtual character is in a shared space with the viewer; the compatibility with 3D monitors allows dimensionally round characters; and real image displays allow the characters to appear in front of the beam splitter, again to hide the illusion and presence of the beam splitter.

The systems 800, 900, 1000, 1100, and 1200 are improvements over other conventional "Pepper's Ghost" types of systems. For example, conventional systems do not utilize virtual mirrors that include selective effects, such as polarization or wavelength selective characteristics. Further, many of the conventional implementations of Pepper's Ghost are done via "physical" structures, rather than relying on the characteristics, such as polarization and wavelength that are utilized in embodiments herein. Moreover, typically special effects designers may lean towards mechanical types of props, such as two-way mirrors and Steinmeier displays, and conventionally are not experienced in active display technology.

Furthermore, the systems 800-1200 using polarization and wavelength selective mirrors and other elements in a non-standard way. To the extent that polarization selective mirrors are used in conjunction with other films/materials/optics they are conventionally used to perform specific tasks (such as on-axis collimation like in a birdbath or pancake mirror configuration) that are related to display of the desired content, rather than generating artificial effects as described herein.

For instance, wire grid polarization selective mirrors are often used with quarter wave plates and curved mirrors (e.g., in a birdbath configuration in some telescopes and augmented reality displays) to separate incoming diverging light with outgoing collimated light. The systems 800-1200 in contrast uses the polarization selective mirror or wavelength selective mirror without these other elements. Furthermore the systems 800-1200 achieve other functionality through the use of additional materials not normally packaged with a wavelength selective mirror or polarization selective mirror to achieve different functionality from standard use cases.

Similarly, brightness enhancement film is typically used with prismatic films and Lambertian scattering films to polarize, homogenize, direct, and recycle light from a backlight.

Similarly, although wavelength selective films for use in 3D glasses are known, the films are used only for the filtering/passing of the light to achieve the right/left eye image separation, not the unexpected effects of the systems of the present disclosure such as enhanced display brightness, user reflection cancelation and other benefits described herein.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A display system for a providing a three-dimensional effect with controlled reflections comprising:
   a display;
   a beam splitter positioned between the display and a viewing location that transmits or reflects light based on one or more wavelengths of the light;
   a physical prop positioned between the beam splitter and the viewing location; and
   a polarizing element positioned between the physical prop and the viewing location,
   wherein:
   the display is oriented to emit light toward the beam splitter and displays an image at least partially viewable in the viewing location through the beam splitter, wherein the display emits wavelengths of light which are substantially transmitted by the beam splitter such that the image is substantially unattenuated by the bean splitter,
   light reflected from the physical prop and further reflected by the beam splitter toward the viewing location is at least partially viewable in the viewing location, and
   light from a viewer which passes through the polarizing element and reflects off the beam splitter is blocked by the polarizing element, substantially attenuating a reflection of the viewer.

2. The display system of claim 1, wherein:
   the beam splitter comprises a wavelength selective mirror; and
   the wavelength selective mirror passes one or more spectrally encoded peaks of light, and reflects light with a respective wavelength or range of wavelengths different than the one or more spectrally encoded peaks of light.

3. The display system of claim 2, wherein the display emits light in the one or more spectrally encoded peaks that passes through the wavelength selective mirror toward the viewing location.

4. The display system of claim 2, further comprising a light source that emits spectrally encoded light into the viewing location, wherein the spectrally encoded light is a broadband spectrum with one or more notches corresponding to the one or more spectrally encoded peaks of light.

5. The display system of claim 4, wherein light reflected by the physical prop and light reflected by the viewer in the viewing location includes the light with the wavelength different than the respective wavelength or range of wavelengths of the one or more spectrally encoded peaks.

6. The display system of claim 5, wherein the light reflected by the physical prop and light reflected by the viewer in the viewing location are incident on the wavelength selective mirror and the wavelength selective mirror reflects the incident light back into the viewing location as reflected light, with the one or more spectrally encoded peaks removed from the reflected light.

7. The display system of claim 2, further comprising a half wave element plus quarter wave element combination positioned between the display and the wavelength selective mirror,
   wherein the polarizing element comprises a circular polarizer.

8. The display system of claim 7, wherein:
   light reflected by the viewer in the viewing location is randomly polarized;
   the light reflected by the viewer passes through the circular polarizer and becomes circularly polarized with a first handedness;
   the light reflected by the viewer reflects from the wavelength selective mirror and becomes circularly polarized with a second handedness opposite the first handedness; and
   the light reflected by the viewer passes through the circular polarizer where the light is canceled, thereby making the light reflected by the viewer not visible by the viewer.

9. The display system of claim 7, further comprising a physical backdrop positioned between the circular polarizer and the wavelength selective mirror, wherein:
   the physical backdrop is illuminated with randomly polarized light that reflects off of the physical backdrop toward the wavelength selective mirror;
   the light reflected off of the physical backdrop reflects off the wavelength selective mirror toward the circular polarizer and travels through the circular polarizer becoming linearly polarized such that the physical backdrop is visible by the viewer as a virtual backdrop distance behind the display.

10. The display system of claim 1, wherein the image comprises an image of an actor on a canted stage.

11. The display system of claim 1, wherein the polarizing element comprises:
a quarter wave plate; and
a linear polarizer positioned between the quarter wave plate and the viewing location.

12. The display system of claim 1, wherein light from the display is spectrally encoded to pass through the beam splitter and the polarizing element to the viewing location, and
wherein light from the viewing location which passes through the polarizing element is polarized with a first handedness, reflects off the beam splitter with an opposite handedness, and is blocked from passing back through the polarizing element.

13. The display system of claim 12, further comprising a half wave plus quarter wave element positioned between the display and the beam splitter and configured to polarize the light from the display with the first handedness such that the light from the display passes substantially unattenuated through the polarizing element to the viewer.

14. The display system of claim 1, wherein the display is configured to emit first spectrally encoded light, wherein the first spectrally encoded light comprises one or more spectral peaks,
the display system further comprising a light source configured to emit a second spectrally encoded light to the viewing location, wherein the second spectrally encoded light is a broadband spectrum with one or more notches, wherein the viewing location is illuminated with a combination of the first spectrally encoded light and the second spectrally encoded light.

15. The display system of claim 14, wherein the one or more spectral peaks match the one or more notches such that the first spectrally encoded light is complimentary to the second spectrally encoded light.

16. A method of providing a three-dimensional (3D) effect with controlled reflections comprising:
providing a display;
providing a beam splitter positioned between the display and the viewing location that transmits or reflects light based on one or more wavelengths of the light;
providing a physical prop positioned between the beam splitter and the viewing location;
providing a polarizing element positioned between the physical prop and the viewing location, wherein:
the display is oriented to emit light toward beam splitter and displays an image at least partially viewable in the viewing location through the beam splitter, wherein the display emits wavelengths of light which are substantially transmitted by the beam splitter such that the image is substantially un-attenuated by the bean splitter,
light reflected from the physical prop and further reflected by the beam splitter toward the viewing location is at least partially viewable in the viewing location, and light from a viewer which passes through the polarizing element and reflects off the beam splitter is blocked by the polarizing element, substantially attenuating a reflection of the viewer.

* * * * *